US006017605A

United States Patent [19]

Yamazaki et al.

[11] Patent Number: 6,017,605

[45] Date of Patent: Jan. 25, 2000

[54] MAGNETIC RECORDING MEDIUM

[75] Inventors: Nobuo Yamazaki; Shinji Saito, both of Kanagawa, Japan

[73] Assignee: Fuji Photo Film Co., Ltd., Kanagawa, Japan

[21] Appl. No.: 09/066,824

[22] Filed: Apr. 28, 1998

[30] Foreign Application Priority Data

Apr. 30, 1997 [JP] Japan .................................... 9-112686

[51] Int. Cl.$^7$ ........................................................ B32B 3/02

[52] U.S. Cl. ......................... 428/65.3; 428/141; 428/328; 428/329; 428/336; 428/694 BR; 428/694 BS; 428/900; 360/135

[58] Field of Search .................................... 428/65.3, 141, 428/328, 329, 336, 694 BR, 694 BS, 900; 360/135

[56] References Cited

U.S. PATENT DOCUMENTS

| | | | |
|---|---|---|---|
| 5,512,350 | 4/1996 | Ryoke et al. | 428/141 |
| 5,908,683 | 6/1999 | Suzuki et al. | 428/141 |

FOREIGN PATENT DOCUMENTS

| | | |
|---|---|---|
| 0729135A2 | 8/1996 | European Pat. Off. . |

OTHER PUBLICATIONS

IEEE Transactions on Magnetics, vol. 26 No. 1, Jan. 1990, pp. 193–197.

*Primary Examiner*—Stevan A. Resan
*Attorney, Agent, or Firm*—Sughrue, Mion, Zinn, Macpeak & Seas, PLLC

[57] ABSTRACT

A magnetic recording medium is described, which comprises a support having thereon a magnetic layer mainly comprising a ferromagnetic powder dispersed in a binder, for a magnetic recording/reproduction system of reproducing recorded signals of from 0.15 to 2 G bit/inch$^2$ of areal recording density with a magneto resistive head (an MR head), wherein the surface of the magnetic recording layer has not more than 100 protrusions having a height of 30 nm or more per 900 $\mu^2$ measured using an atomic force microscope (AFM), the magnetization reversal volume of the magnetic layer is from $0.1\times10^{-17}$ to $5\times10^{-17}$ ml, and the coercive force of the magnetic layer is 2,000 Oe or more.

14 Claims, No Drawings

MAGNETIC RECORDING MEDIUM

FIELD OF THE INVENTION

The present invention relates to a coating type magnetic recording medium having high recording density (i.e., a magnetic recording medium for high density recording which is prepared by means of coating). More specifically, the present invention relates to a coating type magnetic recording medium for high density recording which comprises a magnetic layer on a substantially nonmagnetic lower layer wherein the uppermost magnetic layer contains a ferromagnetic metal fine powder or a hexagonal ferrite fine powder.

BACKGROUND OF THE INVENTION

In the field of a magnetic disc, a 2 MB MF-2HD floppy disc using Co-modified iron oxide has been generally loaded in a personal computer. However, along with the increase in the amount of data to be dealt with, the capacity thereof has become insufficient and the increase of the capacity of the floppy disc has been demanded.

In the field of a magnetic tape, with the prevalence of an office computer such as a minicomputer, a personal computer and a work station, a magnetic tape for recording computer data as external storage medium (a so-called backup tape) has been vigorously studied. For the realization of the magnetic tape for such the use, the improvement of recording capacity has been strongly demanded conjointly with the miniaturization of a computer and the increase of information processing ability (e.g., information throughput).

Magnetic layers comprising an iron oxide, a Co-modified iron oxide, $CrO_2$, a ferromagnetic metal powder, or a hexagonal ferrite powder dispersed in a binder, which are coated on a nonmagnetic support, have been conventionally widely used in magnetic recording media. Ferromagnetic metal fine powders and hexagonal ferrite fine powders among these have been known to have excellent high density recording properties.

In the case of a disc, as high capacity discs using ferromagnetic metal fine powders which are excellent in high density recording characteristics, there are 10 MB MF-2TD and 21 MB MF-2SD, and as high capacity discs using hexagonal ferrite, there are 4 MB MF-2ED and 21 MB Floptical, however, neither of these are satisfactory with respect to capacities and properties. As is the circumstance, various attempts have been made to improve high density recording characteristics. For example, high capacity and high density recording of from 100 M to 200 M, e.g., LS-120 and ZIP, has been realized, and now even higher density recording of areal recording density of 0.15 G bit/inch$^2$ or more has begun to be demanded. In addition, due to the requirement for shortening access time, the rotation frequency of discs has a tendency to increase.

In such a high density, high rotational and high transfer magnetic recording medium, higher running property and higher durability than those of conventional media are required for maintaining stable recording/reproduction.

Prior art techniques proposed for mainly improving recording density and running durability in coating type magnetic recording media are described below.

For example, JP-A-6-52541 (the term "JP-A" as used herein means an "unexamined published Japanese patent application") discloses a magnetic tape having an average protrusion height of abrasives on the magnetic layer surface of 15 nm or less, and electromagnetic characteristics thereof are compatible with durability by improving head abrasion and head contamination.

U.S. Pat. No. 5,512,350 discloses a magnetic disc in which the magnetic layer has Ra of 15 nm or less, protrusions having a height of 30 nm or more are distributed from 125,000 to 250,000 per mm$^2$ of the magnetic layer, and the amount of a lubricant in the magnetic layer is prescribed.

JP-A-6-309650 discloses a magnetic recording medium, in particular a magnetic disc, in which the magnetic layer contains from 8 to 30 parts by weight of a lubricant based on 100 parts by weight of the magnetic powder, and the number of protrusions having the height higher than the face which is 20 nm lower than the highest protrusion is specified to be from 400 to 2,500 per mm$^2$, that is, the amount of the lubricant in the magnetic layer and the existing density of protrusions having specific height on the magnetic layer surface are specified to ensure the running stability.

Magnetic heads making electromagnetic induction as a principle of operation (an induction type magnetic head) have been conventionally used and prevailed. However, there are the limits to their abilities for further higher density recording/reproduction use. That is, it is necessary to increase the number of turns of a reproduction head coil to obtain higher reproduction output, but when the turn number of a reproduction head coil is increased, the inductance increases and the resistance at a high frequency region increases, as a result, reproduction output decreases.

A magnetic head making MR (magneto resistance) as a principle of operation has been proposed in recent years and is coming to be used in a hard disc, etc., and there is proposed in European Patent 729,135 the application thereof to a magnetic tape. An MR head can provide reproduction output of several times as large as that by an induction type magnetic head, and as no induction coil is used, equipment noise such as impedance noise is widely reduced, therefore, it has become possible to obtain a large S/N ratio by reducing the noise of a magnetic recording medium. That is, by reducing the noise of a magnetic recording medium naturally lurked in equipment noise, satisfactory recording/reproduction becomes feasible and high density recording characteristics can be strikingly improved.

However, there is a problem with an MR head such that noise is generated by the influence of a small amount of heat (thermal noise), in particular, if an MR head is touched to the protrusions on the surface of a magnetic layer, noise is suddenly and continuously increased, and in the case of digital recording, the problem is sometimes worsened in such a degree as error correction is impossible.

This problem of thermal noise is serious in a magnetic recording medium for use in a system of reproducing recorded signals of 0.15 G bit/inch$^2$ or more of areal recording density, and it has been expected to be solved from the magnetic recording medium side.

SUMMARY OF THE INVENTION

An object of the present invention is to provide a coating type magnetic recording medium which is excellent in electromagnetic characteristics (e.g., the error rate, in particular, in a high density recording region is noticeably improved), excellent in productivity and inexpensive, and further, which has reduced noise and is superior in high density recording characteristics in a recording/reproduction system integrated with an MR head.

The above object of the present invention has been achieved by the following means:

(1) A magnetic recording medium which comprises a support having thereon a magnetic layer mainly comprising a ferromagnetic powder dispersed in a binder, for a magnetic recording/reproduction system of reproducing recorded signals of from 0.15 to 2 G bit/inch$^2$ (particularly from 0.5 to 2 G bit/inch$^2$) of areal recording density with a magneto resistive head (an MR head), wherein the surface of the magnetic recording layer has not more than 100 protrusions having a height of 30 nm or more per 900 $\mu m^2$ measured using an atomic force microscope (AFM), the magnetization reversal volume of said magnetic layer is from $0.1\times10^{-17}$ to $5\times10^{-17}$ ml, and the coercive force of the magnetic layer is 2,000 Oe or more.

The preferred embodiments of the present invention are shown below.

(2) The magnetic recording medium as described in the above item (1), wherein the surface of the magnetic recording layer has from 500 to 10,000 protrusions having a height of 10 nm or more per 900 $\mu m^2$ measured using an atomic force microscope (AFM).

(3) The magnetic recording medium as described in the above item (1) or (2), wherein the ferromagnetic powder is a ferromagnetic metal powder or a hexagonal ferrite powder.

(4) The magnetic recording medium as described in the above item (1), (2) or (3), wherein the thickness of the magnetic layer is from 0.01 to 0.25 $\mu$m.

(5) The magnetic recording medium as described in the above item (1), (2), (3) or (4), wherein a substantially nonmagnetic lower layer is provided between the magnetic layer and the support.

DETAILED DESCRIPTION OF THE INVENTION

The magnetic recording medium according to the present invention is used for a magnetic recording/reproduction system of reproducing recorded signals of from 0.15 to 2 G bit/inch$^2$ of areal recording density with a magneto resistive head (an MR head).

A recording head for recording signals with the magnetic recording medium according to the present invention is not particularly limited but a magnetic induction type thin film magnetic head, e.g., an MIG head, is preferably used.

It is essential that the number of protrusions having a height of 30 nm or more (hereinafter sometimes referred to as "$N_{30nm}$"), measured using an AFM, on the magnetic layer surface of the magnetic recording medium according to the present invention be regulated to not more than 100 per 900 $\mu m^2$.

It is also essential that the magnetization reversal volume (V) of the magnetic layer according to the present invention be regulated to from $0.1\times10^{-17}$ to $5\times10^{-17}$ ml.

Further, it is essential that the coercive force (Hc) of the magnetic layer according to the present invention be regulated to 2,000 Oe or more.

That is, reproduction with low noise can be realized when the magnetic recording medium according to the present invention is used in a recording/reproduction system of reproducing recorded signals of from 0.15 to 2 G bit/inch$^2$ of areal recording density using an MR head with $N_{30nm}$, V and Hc being regulated within the above ranges.

Areal recording density is represented by the product which is obtained by multiplying linear recording density by track density, and both of linear recording densities and track densities of magnetic discs of 100 MB recording capacities or so now on the market are preferably increased several times for achieving reproduction with low noise. If an areal recording density is smaller than 0.15 G bit/inch$^2$, reproduction can be attained without using the medium constitution of the present invention. If an areal recording density is more than 2 G bit/inch$^2$, reproduction can be attained with difficulty even using the medium constitution of the present invention.

$N_{30nm}$ are measured using an AFM and are generally not more than 100 per 900 $\mu m^2$, preferably not more than 50 per 900 $\mu m^2$. $N_{30nm}$ are preferably as few as possible and the lower limit is zero. The number of protrusions having a height of 10 nm or more (hereinafter sometimes referred to as "$N_{10nm}$") on the magnetic layer surface measured using also an AFM are preferably from 500 to 10,000 per 900 $\mu m^2$, more preferably from 1,000 to 5,000 per 900 $\mu m^2$.

When $N_{30nm}$ are more than 100 per 900 $\mu m^2$, noise increases and when $N_{10nm}$ are less than 500 per 900 $\mu m^2$, running durability is deteriorated.

V is within the range of from $0.1\times10^{-17}$ to $5\times10^{-17}$ ml, but when the ferromagnetic powder is a ferro-magnetic metal powder, V is preferably from $0.1\times10^{-17}$ to $4\times10^{-17}$ ml, and when the ferromagnetic powder is a hexagonal ferrite powder, V is preferably from $0.1\times10^{-17}$ to $2\times10^{-17}$ ml.

When V is less than $0.1\times10^{-17}$ ml, noise is reduced but output is unstable and further contrivance is necessary, while when V is more than $5\times10^{-17}$ ml, the characteristic of an MR head of low noise cannot be used efficiently.

When Hc is less than 2,000 Oe, output is small and areal recording density of from 0.15 to 2 G bit/inch$^2$ cannot be attained. Hc is preferably from 2,500 to 4,000 Oe.

V can be obtained from the following equation. The magnetic field sweep rate of the measuring point of Hc is measured for 5 minutes and 30 minutes using a vibrating sample magnetometer ("VSM-III" manufactured by Toei Kogyo Co., Ltd.), and V can be obtained from the following relational expression of Hc and magnetization reversal volume (V) by thermal fluctuation.

$$Hc=(2K/Ms)\{1-[(kT/KV)ln(At/0.693)]^{1/2}\}$$

wherein

K: Anisotropic constant

Ms: Saturation magnetization k: Boltzmann's constant

T: Absolute temperature

V: Magnetization reversal volume

A: Spin precession frequency t: Magnetic field reversal time

It is thought that V is reciprocally related with particle sizes of ferromagnetic powders, in particular, particle sizes which affect the noise, and as regulating means of V, adjusting particle sizes of ferromagnetic powders (e.g., particle volumes), magnetic characteristics, orientation of a magnetic layer, etc., can be exemplified.

A particle volume of a ferromagnetic metal powder is preferably (from 0.5 to 3.5)$\times10^{-17}$ ml, more preferably (from 0.5 to 2.5)$\times10^{-17}$ ml, and a particle volume of a hexagonal ferrite powder is preferably (from 0.1 to 3.0)$\times10^{-17}$ ml, more preferably (from 0.1 to 1.5)$\times10^{-17}$ ml.

In the present invention, for controlling the protrusions on the surface of a magnetic layer, it is important that particle sizes of granular components contained in a magnetic layer, e.g., a ferromagnetic powder, an abrasive, a carbon black, etc., should be made smaller than those conventionally used and then, moreover, maintaining the dispersibility of the powders in magnetic and/or nonmagnetic coating solutions high, and making the surface roughness of a support smaller than those of conventional supports are better.

An abrasive is generally used in an amount of from 2 to 50 parts by weight, preferably from 5 to 30 parts by weight, based on 100 parts by weight of the ferromagnetic powder.

The amount of binder resins (including a curing agent) contained in a magnetic layer is preferably from 5 to 40 parts by weight, more preferably from 10 to 30 parts by weight, based on 100 parts by weight of the ferromagnetic powder.

Further, for obtaining a high capacity and high density magnetic recording medium, it is particularly important that the thickness of a magnetic layer is made thin, such as 0.30 $\mu$m or less, preferably from 0.01 to 0.25 $\mu$m, in view of demagnetization loss. In such a case of employing a thin magnetic layer, as the shape of the magnetic layer surface according to the present invention is liable to be affected by the surface protrusions of a support, the shape of a support must be particularly taken care of. Specifically, it is effective to use the support of a surface shape having a central plane average surface roughness Ra of generally 10 nm or less, preferably 8 nm or less, measured by 3D-MIRAU method. The lower limit of Ra of the support is preferably 5 nm or so from the viewpoint of handleability and running durability.

In the present invention, the adjusting means of protrusions of the magnetic layer is not limited to the above, and conventionally well-known methods, e.g., a calendering process, a burnishing process using an abrasive tape, a fiber, etc., and a process using a cutting blade, can be used. However, the present invention has an advantage of capable of obtaining the above-described distribution of protrusions without positively conducting these processes.

In the field of personal computers where the tendency of multimedia has been increasingly progressed, high capacity recording media have attracted public attentions in place of conventional floppy discs, e.g., ZIP disc (areal recording density; 96 M bit/inch$^2$) has been on sale from IOMEGA CORP., U.S.A. This is a recording medium comprising a lower layer and a magnetic thin layer developed by the present inventors using ATOMM (Advanced Super Thin Layer & High Output Metal Media Technology), and products of 3.7 inches with the recording capacity of 100 MB or more are on the market. The capacity of from 100 to 120 MB discs is almost equal to the capacity of MO (3.5 inches), i.e., one disc has the capacity of recording newspaper articles of from seven to eight month period. A transfer rate indicating write/readout time of data is 2 MB or more per a second, which is equal to a hard disc, and the working speed is 20 times of conventional floppy discs and more than 2 times of the MO, therefore, extremely advantageous. In addition, as this recording medium comprising a lower layer and a magnetic thin layer is the same coating type medium as floppy discs used at present, mass production is feasible, accordingly inexpensive as compared with hard discs and the MO.

As a result of eager investigations based on the knowledges on these media, the present inventors have achieved the present invention of a magnetic recording medium, in particular, a disc-like magnetic recording medium, having areal recording density of from 0.15 to 2 G bit/inch$^2$ which has markedly big recording capacity as compared with the above ZIP disc and the MO (3.5 inches). This recording medium also has high density characteristics and excellent durability which could never be achieved by any products known in the world and, in particular, the error rate in high density recording region is noticeably improved, and this is the invention applicable to a magnetic tape, e.g., a computer tape.

The present invention comprises preferably an ultra-thin magnetic layer containing a magnetic powder of ultrafine particles excellent in high output and high dispersibility, and a lower layer containing a spherical or acicular inorganic powder, and by thus reducing the thickness of the magnetic layer, a magnetic force offset in the magnetic layer can be reduced, the output in a high frequency region can be markedly increased, further, overwriting characteristics can be improved.

By the improvement of a magnetic head, the effect of the ultrathin magnetic layer can be exhibited the more by the combined use with an MR head of thin MR components (i.e., thin magneto resistive components) and digital recording characteristics can be improved.

The magnetic layer is preferably a thin layer having a thickness of preferably from 0.01 to 0.25 $\mu$m so as to match the performance required from the magnetic recording system and the magnetic head of high density recording. Such a uniform and ultrathin magnetic layer can be attained by high dispersion and high packing density realized by the combined use of a fine magnetic and nonmagnetic powder with a dispersant and a high dispersible binder. The magnetic powders used are preferably ferromagnetic powders capable of achieving high output, excellent in high dispersibility and high randomizing property for inducing suitabilities of high capacity floppy discs and computer tapes as far as possible. That is, high output and high durability can be attained by the use of ferromagnetic metal fine powders or ferromagnetic hexagonal ferrite fine powders of preferably extremely fine particles and capable of achieving high output. For the realization of a high transfer rate, running stability and durability during high speed rotation can be ensured making use of a three dimensional network binder system suitable for an ultrathin magnetic layer. A composite lubricant capable of maintaining the effect thereof during use under various temperature and humidity conditions and in high rotation use can be incorporated into upper and lower layers and, further, with making the lower layer have a role of the tank of the lubricant so as to be able to always supply an appropriate amount of the lubricant to the upper magnetic layer to thereby heighten the durability of the upper magnetic layer to improve the reliance. Cushioning effect of the lower layer can bring about good head touch and stable running property.

A high transfer rate is required in a high capacity recording system. For that sake, it is necessary that the rotation speed of a magnetic disc should be taken up one or more places compared with conventional FD systems. Recording track density is improved with the increase of capacity/density. In general, a servo recording area is provided on a medium to ensure traceability of a magnetic head against a recording track. In the magnetic recording medium according to the present invention, a base whose dimensional stability is isotropically heightened is used as a support base, thereby further stabilization of the traceability is devised. Further, the smoothness of the magnetic layer can be improved by using an ultrasmooth base.

The increment of density of magnetic recording of a disc-like magnetic recording medium requires the improvement of linear recording density and track density. Characteristics of a support are also important factors for the improvement of track density. The dimensional stability of a support base, in particular, a consideration of isotropy, is preferred in the recording medium according to the present invention. Servo recording is an indispensable technique in recording/reproduction of high track density, but the improvement can be contrived from the medium side by making a support base isotropic as far as possible.

Advantages due to ATOMM structure are thought to be as follows.

(1) Improvement of electromagnetic characteristics by the thin layer structure of a magnetic layer a) Improvement of the output in a high frequency region by the improvement of recording demagnetization characteristics b) Improvement of overwriting characteristics c) Security of window margin (2) High output by smoothing an upper magnetic layer (3) Easiness of impartation of request functions by functional separation of a magnetic layer (4) Improvement of durability by a stable supply of lubricants These functions cannot be sufficiently attained only by making a magnetic layer a multilayer structure. To constitute a multilayer structure, a lower layer and an upper layer are coated and, in general, surface treatments such as a curing treatment, a calendering treatment, etc., are conducted. In the case of a floppy disc (FD), as different from a magnetic tape, the same treatment are conducted on both surface sides. After a coating step, a disc undergoes a slitting step, a punching step, a shell incorporation step, and a certifying step, thus a final product is completed. If necessary, after being punched as a disc-like shape, after-treatments such as a thermal treatment by high temperature (generally from 50 to 90° C.) to accelerate curing of the coated layer, and a burnishing treatment with an abrasive tape to scrape off the surface protrusions may be conducted.

Durability is an important factor for a magnetic recording medium (particularly a magnetic disc). For example, for realizing a high transfer rate, it is necessary that the rotation speed of a magnetic disc should be taken up one or more places as compared with conventional FD systems, and security of the durability of a medium is an important problem when a medium is sliding with a magnetic head and parts in a cartridge at a high speed. For improving durability of a medium, there are means such as a binder process to increase the film strength of a medium per se, a means for regulating a lubricant formulation and the like to maintain a sliding property with a magnetic head, etc.

Lubricants are used in combination of a plurality of kinds respectively exhibiting superior effects in various temperature and humidity conditions under which they are used and each lubricant exhibits its function in different temperature (low temperature, room temperature, high temperature) and humidity (low humidity, high humidity) atmospheres, thereby totally stable lubricating effect can be maintained.

By making use of two layer structure, the durability of the upper magnetic layer can be heightened with making the lower layer have a role of the tank of a lubricant capable of always supplying an appropriate amount of a lubricant to the upper magnetic layer. There is a limit on the amount of a lubricant which can be contained in the ultrathin magnetic layer. Simple reduction of the thickness of the magnetic layer causes the reduction of the absolute amount of a lubricant, and it follows that running durability is deteriorated. The improvement of electromagnetic characteristics can be compatible with the improvement of durability by imparting different functions to the upper layer and the lower layer and making up for each other. This functional separation is particularly effective in a system where a medium is slid on a magnetic head at a high speed.

In addition to the maintaining function of a lubricant, a controlling function of surface electrical resistance can be imparted to the lower layer. For controlling electrical resistance, a solid electrically conductive material such as a carbon black is added to a magnetic layer in many cases. Such material not only restricts the increase of the packing density of magnetic powders but also influences the surface roughness of the magnetic layer as the thickness of the magnetic layer becomes thinner. Incorporation of electrically conductive materials in the lower layer can eliminate these defects.

With the progress of multimedia in society, needs for image recording have been increased more and more not only in the industry but also in general homes. The high capacity magnetic recording medium according to the present invention has capabilities capable of sufficiently responding to demands such as function/cost as an image recording medium, as well as data such as letters and figures. The present invention ensures reliability for a long period of time and is excellent in cost performance.

Magnetic Layer

A lower layer and an ultrathin magnetic layer of the magnetic recording medium according to the present invention may be provided on either one side of the support or may be provided on both sides. An upper layer may be coated while a lower layer coated is still wet (W/W coating) or may be coated after the lower layer coated is dried (W/D coating). Simultaneous or successive wet on wet coating is preferred in view of the productivity but in the case of a disc-like medium, wet on dry coating can be sufficiently used. In the multilayer structure according to the present invention, as an upper layer and a lower layer can be formed simultaneously (W/W coating), a surface treatment step, e.g., a calendering step, can be utilized effectively and surface roughness of the upper magnetic layer can be improved even the layer is an ultrathin layer. The coercive force (Hc) of the magnetic layer is essential to be 2,000 Oe or more, and the maximum magnetic flux density (Bm) of a ferromagnetic metal powder is preferably from 2,000 to 5,000 G, and that of a hexagonal ferrite powder is preferably from 1,000 to 3,000 G.

Ferromagnetic Powder

The ferromagnetic powders which can be used in the present invention are not particularly limited but ferromagnetic metal powders containing $\alpha$-Fe as a main component and hexagonal ferrite powders are preferably used. These ferromagnetic metal powders which can be preferably used in the magnetic layer of the present invention may contain, in addition to the prescribed atoms, the following atoms, e.g., Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. In particular, it is preferred to contain at least one of Al, Si, Ca, Y, Ba, La, Nd, Co, Ni and B, in addition to $\alpha$-Fe, and more preferably at least one of Co, Y and Al in addition to $\alpha$-Fe. The content of Co is preferably from 0 to 40 atomic %, more preferably from 15 to 35 atomic %, and most preferably from 20 to 35 atomic %, the content of Y is preferably from 1.5 to 12 atomic %, more preferably from 3 to 10 atomic %, and most preferably from 4 to 9 atomic %, the content of Al is preferably from 1.5 to 12 atomic %, more preferably from 3 to 10 atomic %, and most preferably from 4 to 9 atomic %, each based on Fe.

These ferromagnetic (metal) powders may be previously treated with the later described dispersant, lubricant, surfactant, and antistatic agent before dispersion. Specific examples thereof are disclosed in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639 (the term "JP-B" as used herein means an "examined Japanese patent publication"), U.S. Pat. Nos. 3,026,215, 3,031,341, 3,100,194, 3,242,005, and 3,389,014.

Ferromagnetic powders may contain a small amount of a hydroxide or an oxide. Ferromagnetic metal powders can be prepared by well-known processes, such as a method comprising reducing a composite organic acid salt (mainly an oxalate) with a reducing gas, e.g., hydrogen; a method comprising reducing iron oxide with a reducing gas, e.g., hydrogen, to obtain Fe or Fe-Co particles; a method comprising pyrolysis of a metal carbonyl compound; a method comprising adding to an aqueous solution of a ferromagnetic metal a reducing agent, e.g., sodium boronhydride, hypophosphite, or hydrazine, to conduct reduction; and a method comprising evaporating a metal in a low pressure inert gas to obtain a fine powder. The thus-obtained ferromagnetic metal powders which are subjected to well-known gradual oxidization treatment can be used in the present invention, e.g., a method comprising immersing powders in an organic solvent, then drying; a method comprising immersing powders in an organic solvent, then charging an oxygen-containing gas to form oxide films on the surfaces thereof and drying; and a method comprising forming oxide films on the surfaces of the powders by regulating partial pressure of an oxygen gas and an inert gas without using an organic solvent.

Ferromagnetic metal powders which can be preferably used in the magnetic layer according to the present invention have a specific surface area ($S_{BET}$) as measured by the BET method of from 45 to 80 $m^2$/g, preferably from 50 to 70 $m^2$/g. When $S_{BET}$ is 45 $m^2$/g or less, noise increases and when 80 $m^2$/g or more, good surface property is obtained with difficulty, which is not preferred. Ferromagnetic metal powders which can be preferably used in the magnetic layer according to the present invention have a crystallite size of generally from 80 to 180 Å, preferably from 100 to 180 Å, and more preferably from 110 to 175 Å. The length of a long axis of ferromagnetic metal powders is generally from 0.01 to 0.15 $\mu$m, preferably from 0.03 to 0.15 $\mu$m, and more preferably from 0.03 to 0.12 $\mu$m. Ferromagnetic metal powders preferably have an acicular ratio of from 3 to 15, more preferably from 5 to 12. Ferromagnetic metal powders have a saturation magnetization ($\sigma_s$) of generally from 100 to 180 emu/g, preferably from 110 to 170 emu/g, and more preferably from 125 to 160 emu/g. Ferromagnetic metal powders have a coercive force (Hc) of preferably from 2,000 to 3,500 Oe, and more preferably from 2,200 to 3,000 Oe.

Ferromagnetic metal powders preferably have a water content of from 0.01 to 2%. The water content of ferromagnetic metal powders is preferably optimized by selecting the kinds of binders.

The pH of ferromagnetic metal powders is preferably optimized by the combination with the binder to be used. The pH range is from 4 to 12, preferably from 6 to 10. Ferromagnetic metal powders may be surface-treated with Al, Si, P or oxides thereof, if necessary. The amount thereof is from 0.1 to 10% based on the ferromagnetic metal powders. Adsorption of a lubricant, e.g., aliphatic acid, becomes 100 mg/$m^2$ or less by conducting a surface treatment, which is, therefore, preferred. Soluble inorganic ions (e.g., Na, Ca, Fe, Ni, Sr, etc.) are sometimes contained in ferromagnetic metal powders. It is preferred substantially not to contain such the soluble inorganic ions but the properties of ferromagnetic metal powders are not particularly affected if the content is 200 ppm or less. Ferromagnetic metal powders for use in the present invention preferably have less voids and the value thereof is 20% by volume or less, more preferably 5% by volume or less. The shape of ferromagnetic metal powders is not particularly limited, and any shape such as an acicular shape, an ellipsoidal shape or a spindle shape may be used so long as it satisfies the above-described properties as to particle sizes. Switching Field Distribution (SFD) of a ferromagnetic metal powder itself is preferably small, preferably 0.8 or less. It is necessary to make Hc distribution of ferromagnetic metal powders narrow. When the SFD is 0.8 or less, electromagnetic characteristics are excellent, high output can be obtained, reversal of magnetization becomes sharp and peak shift is less, therefore, suitable for high density digital magnetic recording. For achieving small Hc distribution, making particle size distribution of goethite in ferromagnetic metal powders good and preventing sintering are effective methods.

Hexagonal ferrite powders which can be preferably used in the magnetic layer of the present invention are described below.

Examples of hexagonal ferrite which can be preferably used in the magnetic layer in the present invention include substitution products of barium ferrite, strontium ferrite, lead ferrite and calcium ferrite and Co substitution products. Specifically, magnetoplumbite type barium ferrite and strontium ferrite, magnetoplumbite type ferrite having covered the particle surfaces with spinel, magnetoplumbite type barium ferrite and strontium ferrite partially containing spinel phase, etc. Hexagonal ferrite powders may contain, in addition to the prescribed atoms, the following atoms, e.g., Al, Si, S, Sc, Ti, V, Cr, Cu. Y. Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, those containing the following elements can be used, e.g., Co-Zn, Co-Ti, Co-Ti-Zr, Co-Ti-Zn, Ni-Ti-Zn, Nb-Zn-Co, Sb-Zn-Co, Nb-Zn, etc. According to starting materials and producing processes, specific impurities may be contained.

The hexagonal ferrite has a hexagonal tabular diameter of from 10 to 100 nm, preferably from 10 to 60 nm, and particularly preferably from 10 to 50 nm.

When reproduction is conducted using an MR head for increasing track density, it is necessary to reduce noise, accordingly the tabular diameter is preferably 40 nm or less, but if it is smaller than 10 nm, stable magnetization cannot be obtained due to thermal fluctuation. While when it is more than 100 nm, noise increases, therefore, both of such the particle diameters are not suitable for high density recording. A tabular ratio (tabular diameter/tabular thickness) is preferably from 1 to 15, more preferably from 1 to 7. If a tabular ratio is small, the packing density in a magnetic layer becomes high, which is preferred but satisfactory orientation cannot be obtained. If a tabular ratio is more than 15, noise increases due to stacking among particles. The specific surface area ($S_{BET}$) measured by the BET method of the particles having diameters within this range is from 10 to 100 $m^2$/g. Specific surface areas nearly coincide with the values obtained by arithmetic operations from tabular diameters and tabular thicknesses. Distribution of tabular diameter/tabular thickness is generally preferably as narrow as possible. It is difficult to show specific surface area distributions in numerical values but distributions can be compared by measuring TEM photographs of 500 particles selected randomly. Distributions are in many cases not regular distribution, but when expressed by the standard deviation to the average diameter from calculation, $\sigma$/average diameter is from 0.1 to 2.0. For obtaining narrow particle size distribution, it is efficient to make a particle forming reaction system homogeneous as far as possible, and particles formed are subjected to distribution-improving treatments as well. For example, a method of selectively dissolving ultrafine particles in an acid solution is also known. Coercive force (Hc) of generally from about 500 to about 5,000 Oe measured in magnetic powders can be produced. Higher Hc is advantageous for high density recording but it is restricted by capacities of recording heads. The magnetic powders according to the present invention have Hc of from about 2,000 to about 4,000 Oe, preferably from 2,200 to 3,500 Oe. When saturation magnetization is more than 1.4 tesla, Hc of 2,200 Oe or more is preferred. Hc can be controlled by particle diameters (tabular diameter/tabular thickness), kinds and amounts of elements contained, substitution sites of elements, and reaction conditions of particle formation. Saturation magnetization ($\sigma s$) is from 40 to 80 emu/g. $\sigma s$ is preferably higher but it has inclination of becoming smaller as particles become finer. For the improvement thereof, it is well known to make composite of magnetoplumbite ferrite with spinel ferrite, to select kinds and amounts of elements to be contained, or W type hexagonal ferrite can also be used. Further, when magnetic powders are dispersed, particle surfaces of magnetic powders may be treated with substances compatible with the dispersion media and the polymers. Inorganic or organic compounds are used as a surface treating agent. For example, oxide or hydroxide of Si, Al, P, etc., various kinds of silane coupling agents, and various kinds of titanium coupling agents are representative examples. The amount of these surface treating agents is from 0.1 to 10% based on the amount of the magnetic powder. The pH of magnetic powders is also important for dispersion, and is in general from 4 to 12. The optimal value is dependent upon the dispersion medium and the polymer. Taking chemical stability and storage stability of magnetic media into consideration, pH of from 6 to 11 or so is selected. The water content in the magnetic powder also affects dispersion. The optimal value is dependent upon the dispersion medium and the polymer, and the water content of from 0.01 to 2.0% is selected in general. Producing methods of hexagonal ferrite include the following and any of these methods can be used in the present invention: (1) a glass crystallization method in which metal oxides which substitute barium oxide, iron oxide and iron, and boron oxide, etc., as a glass forming material are mixed so as to become a desired ferrite composition, melted, and then quenched to obtain an amorphous product, the obtained product is reheat-treated, washed and then pulverized to obtain a barium ferrite crystal powder, (2) a hydrothermal reaction method in which a solution of barium ferrite composition metal salts is neutralized with an alkali, byproducts are removed followed by liquid phase heating at 100° C. or more, washed, dried and then pulverized to obtain a barium ferrite crystal powder, and (3) a coprecipitation method in which a solution of barium ferrite composition metal salts is neutralized with an alkali, byproducts are removed followed by drying, treated at 1,100° C. or less, and then pulverized to obtain a barium ferrite crystal powder.

Nonmagnetic Layer

The lower nonmagnetic layer provided between the support and the magnetic layer is described in detail below. The structure of the lower layer according to the present invention is not particularly limited so long as it is substantially nonmagnetic, but in general the lower layer is composed of at least resins, preferably powders, e.g., inorganic or organic powders dispersed in resins can be exemplified. The inorganic powders are in general preferably nonmagnetic powders but magnetic powders may be used as long as the lower layer is substantially nonmagnetic.

Inorganic powders can be selected from the following inorganic compounds such as metal oxide, metal carbonate, metal sulfate, metal nitride, metal carbide, metal sulfide, etc. Examples of inorganic compounds are selected from the following compounds and they can be used alone or in combination, e.g., $\alpha$-alumina having an alpha-conversion rate of 90% or more, $\beta$-alumina, $\gamma$-alumina, $\theta$-alumina, silicon carbide, chromium oxide, cerium oxide, $\alpha$-iron oxide, hematite, goethite, corundum, silicon nitride, titanium carbide, titanium oxide, silicon dioxide, stannic oxide, magnesium oxide, tungsten oxide, zirconium oxide, boron nitride, zinc oxide, calcium carbonate, calcium sulfate, barium sulfate, and molybdenum disulfide. Of these compounds, particularly preferred are titanium dioxide, zinc oxide, iron oxide and barium sulfate because they have small particle size distribution and various means for imparting functions, and more preferred are titanium dioxide and $\alpha$-iron oxide. These nonmagnetic powders preferably have a particle size of from 0.005 to 2 $\mu$m. If desired, a plurality of nonmagnetic powders each having a different particle size may be combined, or a single nonmagnetic powder having a broad particle size distribution may be employed so as to attain the same effect as such the combination. A particularly preferred particle size of the nonmagnetic powders is from 0.01 to 0.2 $\mu$m. In particular, when the nonmagnetic powder is a granular metal oxide, the average particle size thereof is preferably 0.08 $\mu$m or less, and when it is an acicular metal oxide, the long axis length thereof is preferably 0.3 $\mu$m or less, more preferably 0.2 $\mu$m or less. Nonmagnetic powders for use in the present invention have a tap density of from 0.05 to 2 g/ml, preferably from 0.2 to 1.5 g/ml; a water content of from 0.1 to 5 wt %, preferably from 0.2 to 3 wt %, and more preferably from 0.3 to 1.5 wt %; a pH value of from 2 to 11, particularly preferably between 3 and 10; a specific surface area ($S_{BET}$) of from 1 to 100 $m^2$/g, preferably from 5 to 80 $m^2$/g, and more preferably from 10 to 70 $m^2$/g; a crystallite size of from 0.004 to 1 $\mu$m, more preferably from 0.04 to 0.1 $\mu$m; an oil absorption amount using DBP (dibutyl phthalate) of from 5 to 100 ml/100 g, preferably from 10 to 80 ml/100 g, and more preferably from 20 to 60 ml/100 g; and a specific gravity of from 1 to 12, preferably from 3 to 6. The shape of nonmagnetic powders may be any of acicular, spherical, polyhedral, or tabular shapes. Nonmagnetic powders preferably have a Mohs' hardness of from 4 to 10. The SA (stearic acid) absorption amount of nonmagnetic powders is from 1 to 20 $\mu$mol/$m^2$, preferably from 2 to 15 $\mu$mol/$m^2$, and more preferably from 3 to 8 $\mu$mol/$m^2$. The surfaces of these nonmagnetic powders are preferably covered with $Al_2O_3$, $SiO_2$, $TiO_2$, $ZrO_2$, $SnO_2$, $Sb_2O_3$, ZnO or $Y_2O_3$. Preferred in the point of dispersibility are $Al_2O_3$, $SiO_2$, $TiO_2$ and $ZrO_2$, and more preferred are $Al_2O_3$, $SiO_2$ and $ZrO_2$. They can be used in combination or alone. A method in which the surface treatment may be performed by coprecipitation, alternatively, surface treatment of particles may be previously performed to be covered with alumina in the first place, then the alumina-covered surface is covered with silica, or vice versa, according to purposes. The surface-covering layer may be porous layer, if necessary, but a homogeneous and dense surface is generally preferred.

Specific examples of nonmagnetic powders for use in the lower layer according to the present invention include Nanotite (manufactured by Showa Denko Co., Ltd.), HIT-100 and ZA-G1 (manufactured by Sumitomo Chemical Co., Ltd.), $\alpha$-hematite DPN-250, DPN-250BX, DPN-245, DPN-270BX, DPN-500BX, DBN-SA1, and DBN-SA3 (manufactured by Toda Kogyo Co., Ltd.), titanium oxide TTO-51B, TTO-55A, TTO-55B, TTO-55C, TTO-55S, TTO-55D, SN-100, $\alpha$-hematite E270, E271, E300, and E303 (manufactured by Ishihara Sangyo Kaisha Ltd.), titanium oxide STT-4D, STT-30D, STT-30, STT-65C, and $\alpha$-hematite α-40 (manufactured by Titan Kogyo Co., Ltd.), MT-100S, MT-100T, MT-150W, MT-500B, MT-600B, MT-100F, and MT-500HD (manufactured by Teika Co., Ltd.), FINEX-25, BF-1, BF-10, BF-20, and ST-M (manufactured by Sakai Chemical Industry Co., Ltd.), DEFIC-Y and DEFIC-R (manufactured by Dowa Mining Co., Ltd.), AS2BM and TiO2P25 (manufactured by Nippon Aerosil Co., Ltd.), and 100A, 500A and calcined products thereof (manufactured by Ube Industries, Ltd.). Particularly preferred nonmagnetic powders are titanium dioxide and α-iron oxide.

By the incorporation of carbon blacks into the lower layer, a desired micro Vickers' hardness can be obtained in addition to the well-known effects of reducing surface electrical resistance (Rs) and light transmittance. Further, it is also possible to obtain the effect of stocking a lubricant by the incorporation of carbon blacks into the lower layer. Furnace blacks for rubbers, thermal blacks for rubbers, carbon blacks for coloring, acetylene blacks, etc. can be used therefor. Carbon blacks used in the lower layer should optimize the following characteristics by the desired effects and sometimes more effects can be obtained by the combined use.

Carbon blacks for use in the lower layer according to the present invention have a specific surface area ($S_{BET}$) of from 100 to 500 $m^2/g$, preferably from 150 to 400 $m^2/g$, a DBP absorption of from 20 to 400 ml/100 g, preferably from 30 to 400 ml/100 g, an average particle size of from 5 to 80 m$\mu$, preferably from 10 to 50 m$\mu$, and more preferably from 10 to 40 m$\mu$, pH of from 2 to 10, a water content of from 0.1 to 10%, and a tap density of from 0.1 to 1 g/ml. Specific examples of carbon blacks for use in the present invention include BLACKPEARLES 2000, 1300, 1000, 900, 800, 880 and 700, and VULCAN XC-72 (manufactured by Cabot Co., Ltd.), #3050B, #3150B, #3250B, #3750B, #3950B, #950, #650B, #970B, #850B, MA-600, MA-230, #4000 and #4010 (manufactured by Mitsubishi Kasei Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.). Carbon blacks for use in the present invention may previously be surface-treated with a dispersant, may be grafted with a resin, or a part of the surface thereof may be graphitized before use. The carbon black may be previously dispersed in a binder before addition to the coating solution. Carbon blacks can be used within the range not exceeding 50% by weight based on the above inorganic powders and not exceeding 40% by weight based on the total weight of the nonmagnetic layer. These carbon blacks can be used alone or in combination. Regarding carbon blacks for use in the present invention, for example, the disclosure in *Handbook of Carbon Blacks* (edited by Carbon Black Association of Japan) may be referred to.

Organic powders can be used in the lower layer according to the purpose. Examples of such the organic powders include an acryl styrene resin powder, a benzoguanamine resin powder, a melamine resin powder, and a phthalocyanine pigment. In addition, at least one of a polyolefin resin powder, a polyester resin powder, a polyamide resin powder, a polyimide resin powder, and a polyethylene fluoride resin powder can also be used. The producing methods thereof are disclosed in JP-A-62-18564 and JP-A-60-255827.

Binder resins, lubricants, dispersants, additives, solvents, dispersing methods, etc., used for the magnetic layer described below can be used in the lower layer. In particular, with respect to the amounts and the kinds of binder resins, additives, the amounts and the kinds of dispersants, well-known prior art techniques regarding the magnetic layer can be applied in the lower layer.

Binder

Conventionally well-known thermoplastic resins, thermosetting resins, reactive resins and mixtures of these resins are used as a binder in the present invention. Thermoplastic resins having a glass transition temperature of from −100 to 150° C., a number average molecular weight of from 1,000 to 200,000, preferably from 10,000 to 100,000, a polymerization degree of about 50 to 1,000 can be used in the present invention.

Examples thereof include polymers or copolymers containing as a constituting unit the following compounds, such as vinyl chloride, vinyl acetate, vinyl alcohol, maleic acid, acrylic acid, acrylate, vinylidene chloride, acrylo-nitrile, methacrylic acid, methacrylate, styrene, butadiene, ethylene, vinyl butyral, vinyl acetal and vinyl ether; polyurethane resins and various rubber resins. Examples of thermosetting resins and reactive resins usable in the present invention include phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyesterpolyol and polyisocyanate, and mixtures of polyurethane and polyisocyanate. Details on these resins are described in *Plastic Handbook,* published by Asakura Shoten. It is also possible to use well-known electron beam curable type resins in each layer. Examples of these resins and producing methods are disclosed in detail in JP-A-62-256219. These resins can be used alone or in combination. Examples of preferred combinations include at least one selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with polyurethane resins, or combinations of these resins with polyisocyanate.

As polyurethane resins, those having well-known structures can be used, e.g., polyester polyurethane, polyether polyurethane, polyether polyester polyurethane, polycarbonate polyurethane, polyester polycarbonate polyurethane, polycaprolactone polyurethane, etc. Preferably, at least one polar group selected from the following groups is introduced into the above binders by copolymerization or addition reaction for the purpose of further improving the dispersibility and the durability, e.g., —COOM, —$SO_3M$, —$OSO_3M$, —P═O$(OM)_2$, —O—P═O$(OM)_2$ (wherein M represents a hydrogen atom, or an alkali metal salt group), —OH, —$NR^2$, —$N^+R_3$ (R represents a hydrocarbon group), an epoxy group, —SH, or —CN. The content of the polar group is from $10^{-1}$ to $10^{-8}$ mol/g, preferably from $10^{-2}$ to $10^{-6}$ mol/g.

Specific examples of binders for use in the present invention include VAGH, VYHH, VMCH, VAGF, VAGD, VROH, VYES, VYNC, VMCC, XYHL, YXSG, PKHH, PKHJ, PKHC, and PKFE (manufactured by Union Carbide Co., Ltd.), MPR-TA, MPR-TA5, MPR-TAL, MPR-TSN, MPR-TMF, MPR-TS, MPR-TM, and MPR-TAO (manufactured by Nisshin Chemical Industry Co., Ltd.), 1000W, DX80, DX81, DX82, DX83, and 100FD (manufactured by Electro Chemical Industry Co., Ltd.), MR-104, MR-105, MR-110, MR-100, MR-555, 400X-110A (manufactured by Nippon Zeon Co., Ltd.), Nippollan N2301, N2302, and N2304 (manufactured by Nippon Polyurethane Co., Ltd.), Pandex T-5105, T-R3080, T-5201, Burnock D-400, D-210-80, Crisvon 6109 and 7209 (manufactured by Dainippon Chemicals and Ink.), Vylon UR8200, UR8300, UR8700, RV530, and RV280 (manufactured by Toyobo Co., Ltd.), Daipheramine 4020, 5020, 5100, 5300, 9020, 9022, and 7020 (manufactured by Dainichi Seika K. K.), MX5004 (manufactured by Mitsubishi Kasei Corp.), Sunprene SP-150 (manufactured by Sanyo Chemical Industries Co. Ltd.), Salan F310 and F210 (manufactured by Asahi Chemical Industry Co., Ltd.), etc.

The amount of the binder for use in the nonmagnetic layer and the magnetic layer according to the present invention is from 5 to 50 wt %, preferably from 10 to 30 wt %, based on the amount of the nonmagnetic powder or the ferromagnetic powder. When vinyl chloride resins are used, the amount thereof is from 5 to 30 wt %, when polyurethane resins are used, the amount of the polyurethane resin is from 2 to 20 wt % and also it is preferred polyisocyanate is used in an amount of from 2 to 20 wt % in combination. However, for instance, when head corrosion is caused by a slight amount of chlorine due to dechlorination, it is possible to use polyurethane alone or a combination of polyurethane and isocyanate. When polyurethane is used in the present invention, the polyurethane has a glass transition temperature of from −50 to 150° C., preferably from 0 to 100° C., more preferably from 30 to 90° C., breaking extension of from 100 to 2,000%, breaking stress of from 0.05 to 10 $kg/mm^2$, and a yielding point of from 0.05 to 10 $kg/mm^2$.

The magnetic recording medium according to the present invention may comprise two or more layers. Accordingly, the amount of the binder, the amounts of vinyl chloride resins, polyurethane resins, polyisocyanates or other resins contained in the binder, the molecular weight of each resin constituting the magnetic layer, the amount of polar groups, or the above-described physical properties of resins can of course be varied in the nonmagnetic layer and the magnetic layer, according to necessity. These factors should be rather optimized in respective layers. Well-known techniques with respect to multilayer magnetic layers can be used in the present invention. For example, when the amount of the binder is varied in each layer, it is effective to increase the amount of the binder contained in the magnetic layer to reduce scratches on the surface of the magnetic layer. For improving the head touch against the head, it is effective to increase the amount of the binder in the nonmagnetic layer to impart flexibility.

Examples of the polyisocyanates which can be used in the present invention include isocyanates, e.g., tolylenediisocyanate, 4,4'-diphenylmethanediisocyanate, hexamethylenediisocyanate, xylylenediisocyanate, naphthylene-1,5-diisocyanate, o-toluidinediisocyanate, isophoronediisocyanate, and triphenylmethanetriisocyanate; reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR, and Millionate MTL (manufactured by Nippon Polyurethane Co., Ltd.), Takenate D-102, Takenate D-110N, Takenate D-200, Takenate D-202 (manufactured by Takeda Chemical Industries, Ltd.), and Desmodur L, Desmodur IL, Desmodur N, and Desmodur HL (manufactured by Sumitomo Bayer Co., Ltd., Japan). These may be used alone or in combinations of two or more thereof, taking advantage of a difference in curing reactivity in each layer.

Carbon Black, Abrasive

Examples of carbon blacks for use in the magnetic layer according to the present invention include furnace blacks for rubbers, thermal blacks for rubbers, carbon blacks for coloring, acetylene blacks, etc. Carbon blacks for use in the magnetic layer of the present invention have a specific surface area ($S_{BET}$) of from 5 to 500 $m^2/g$, a DBP absorption of from 10 to 400 ml/100 g, an average particle size of from 5 to 300 mμ, preferably from 10 to 250 mμ, more preferably from 20 to 200 mμ, pH of from 2 to 10, a water content of from 0.1 to 10%, and a tap density of from 0.1 to 1 g/ml. Specific examples of carbon blacks for use in the magnetic layer of the present invention include BLACKPEARLES 2000, 1300, 1000, 900, 905, 800 and 700 and VULCAN XC-72 (manufactured by Cabot Co., Ltd.), #80, #60, #55, #50 and #35 (manufactured by Asahi Carbon Co., Ltd.), #2400B, #2300, #900, #1000, #30, #40 and #10B (manufactured by Mitsubishi Kasei Corp.), CONDUCTEX SC, RAVEN 150, 50, 40 and 15, RAVEN-MT-P (manufactured by Columbia Carbon Co., Ltd.), and Ketjen Black EC (manufactured by Akzo Co., Ltd.). Carbon blacks for use in the present invention may previously be surface-treated with a dispersant, may be grafted with a resin, or a part of the surface thereof may be graphitized before use. Carbon blacks may be previously dispersed in a binder before addition to the magnetic coating solution. These carbon blacks may be used alone or in combination. Carbon blacks are preferably used in an amount of from 0.1 to 30 wt % based on the amount of the ferromagnetic powder. Carbon blacks can serve various functions such as preventing static charges, reducing a friction coefficient, imparting a light-shielding property and improving a film strength. Such functions vary depending upon the kind of carbon blacks to be used. Accordingly, it is of course possible in the present invention to select and determine the kinds, the amounts and the combinations of the carbon blacks to be added to the upper magnetic layer and the lower nonmagnetic layer, on the basis of the above mentioned various properties such as the particle size, the oil absorption amount, the electroconductivity and the pH value, or these should be rather optimized in respective layers. Regarding carbon blacks for use in the magnetic layer of the present invention, for example, the disclosure in *Handbook of Carbon Blacks* (edited by Carbon Black Association of Japan) can be referred to.

As the abrasive usable in the present invention, well-known materials essentially having a Mohs' hardness of 6 or more may be used alone or in combination. Examples of such the abrasives include α-alumina having an alpha-conversion rate of 90% or more, β-alumina, silicon carbide, chromium oxide, cerium oxide, α-iron oxide, corundum, artificial diamond, silicon nitride, silicon carbide, titanium carbide, titanium oxide, silicon dioxide, and boron nitride. Composites composed of these abrasives (abrasives obtained by surface-treating with other abrasives) may also be used. Compounds or elements other than the main component are often contained in these abrasives, but the intended effect can be attained so far as the content of the main component is 90% or more. Abrasives preferably have a particle size of from 0.01 to 2 μm, more preferably from 0.05 to 1.0 μm, and particularly preferably from 0.05 to 0.5 μm. In particular, for improving electromagnetic characteristics, abrasives having narrow particle size distribution are preferred. For improving durability, a plurality of abrasives each having a different particle size may be combined according to necessity, or a single abrasive having a broad particle size distribution may be employed so as to attain the same effect as such a combination. Preferably, abrasives for use in the present invention have a tap density of from 0.3 to 2 g/ml, a water content of from 0.1 to 5%, a pH value of from 2 to 11 and a specific surface area ($S_{BET}$) of from 1 to 30 $m^2/g$. The shape of the abrasives to be used in the present invention may be any of acicular, spherical and die-like shapes. Preferably, the abrasive has a shape partly with edges, because a high abrasive property is given.

Specific examples of abrasives for use in the present invention include AKP-12, AKP-15, AKP-20, AKP-30, AKP-50, HIT-20, HIT-30, HIT-55, HIT-60, HIT-70, HIT-80, and HIT-100 (manufactured by Sumitomo Chemical Co., Ltd.), ERC-DBM, HP-DBM, and HPS-DBM (manufactured by Reynolds International Inc.), WA10000 (manufactured by Fujimi Kenma K. K.), UB20 (manufactured by Uemura Kogyo K. K.), G-5, Kromex U2, and Kromex U1 (manufactured by Nippon Chemical Industrial Co., Ltd.), TF100 and TF140 (manufactured by Toda Kogyo Co., Ltd.), β-Random and Ultrafine (manufactured by Ibiden Co., Inc.), and B-3 (manufactured by Showa Mining Co., Ltd.). These abrasives may be added to a nonmagnetic layer, if necessary. By incorporating abrasives into a nonmagnetic layer, it is possible to control the surface shape or prevent abrasives from protruding. Particle sizes and amounts to be added to a magnetic layer and a nonmagnetic layer should be selected independently at optimal values.

Additive

As additives which can be used in the magnetic layer and the nonmagnetic layer of the present invention, those having a lubricating effect, an antistatic effect, a dispersing effect and a plasticizing effect may be used. Examples of additives which can be used in the present invention include molybdenum disulfide, tungsten disulfide, graphite, boron nitride, graphite fluoride, silicone oil, polar group-containing silicons, fatty acid-modified silicons, fluorine-containing silicons, fluorine-containing alcohols, fluorine-containing esters, polyolefins, polyglycols, alkyl phosphates and alkali metal salts thereof, alkyl sulfates and alkali metal salts thereof, polyphenyl ethers, phenylphosphonic acids, α-naphthylphosphoric acids, phenylphosphoric acids, diphenylphosphoric acids, p-ethyl-benzenephosphonic acids, phenylphosphinic acids, amino-quinones, various kinds of silane coupling agents, titanium coupling agents, fluorine-containing alkyl sulfates and alkali metal salts thereof, monobasic fatty acids having from 10 to 24 carbon atoms (which may contain an unsaturated bond or which may be branched) and metal salts thereof (e.g., with Li, Na, K or Cu), mono-, di-, tri-, tetra-, penta- or hexa- alcohols having from 12 to 22 carbon atoms (which may contain an unsaturated bond or may be branched), alkoxy alcohols having from 12 to 22 carbon atoms, mono-fatty acid esters, di-fatty acid esters or tri-fatty acid esters composed of a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched); fatty acid esters of monoalkyl ethers of alkylene oxide polymers, fatty acid amides having from 8 to 22 carbon atoms, and aliphatic amines having from 8 to 22 carbon atoms.

Specific examples of fatty acids for such the additives include capric acid, caprylic acid, lauric acid, myristic acid, palmitic acid, stearic acid, behenic acid, oleic acid, elaidic acid, linolic acid, linolenic acid, and isostearic acid. Examples of esters include butyl stearate, octyl stearate, amyl stearate, isooctyl stearate, butyl myristate, octyl myristate, butoxyethyl stearate, butoxy-diethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucic acid, neopentyl glycol didecanoate, and ethylene glycol dioleate, and examples of alcohols for the additives include oleyl alcohol, stearyl alcohol and lauryl alcohol. Additionally, examples of other additives which may be used include nonionic surfactants such as alkylene oxides, glycerols, glycidols or alkylphenol-ethylene oxide adducts; cationic surfactants such as cyclic amines, ester amides, quaternary ammonium salts, hydantoin derivatives, heterocyclic compounds, phosphoniums or sulfoniums; anionic surfactants containing an acidic group such as carboxylic acid, sulfonic acid, phosphoric acid, sulfate groups or phosphate groups; and amphoteric surfactants such as amino acids, aminosulfonic acids, sulfates or phosphates of amino alcohols or alkylbetains. The details of these surfactants are described in *Handbook of Surfactants* (published by Sangyo Tosho Co., Ltd.). These lubricants and antistatic agents may not always be 100% pure and may contain impurities such as isomers, non-reacted materials, byproducts, decomposed products and oxides, in addition to the main component. However, the content of such impurities is preferably 30% or less, more preferably 10% or less.

Lubricants and surfactants for use in the present invention respectively have different physical functions. The kinds, amounts and proportions of combination generating synergistic effect of these lubricants should be determined optimally in accordance with the purpose. The nonmagnetic layer and the magnetic layer can separately contain different fatty acids each having a different melting point so as to prevent bleeding out of the fatty acids to the surface, or different esters each having a different boiling point, a different melting point or a different polarity so as to prevent bleeding out of the esters to the surface. Also, the amounts of surfactants are controlled so as to improve the coating stability, or the amount of the lubricant in the lower layer is made larger so as to improve the lubricating effect of the surface thereof. Examples are by no means limited thereto. In general, the total amount of the lubricants is from 0.1 to 50%, preferably from 2 to 25%, based on the amount of the magnetic powder or the nonmagnetic powder.

All or a part of the additives to be used in the present invention may be added to the magnetic coating solution or the nonmagnetic coating solution in any step of the preparation. For example, additives may be blended with a magnetic powder before the kneading step, may be added during the step of kneading a magnetic powder, a binder and a solvent, may be added during the dispersing step, may be added after the dispersing step, or may be added immediately before coating. According to the purpose, there is a case of capable of attaining the object by coating all or a part of the additives simultaneously with or successively after the coating of the magnetic layer. According to the purpose, lubricants may be coated on the surface of the magnetic layer after the calendering treatment or after the completion of slitting.

Well-known organic solvents can be used in the present invention, for example, organic solvents disclosed in JP-6-68453 can be used.

Layer Construction

The thickness of the support in the magnetic recording medium of the present invention is, for example, from 2 to 100 μm, preferably from 2 to 80 μm. Particularly, the thickness of the support for a computer tape is from 3.0 to 6.5 μm, preferably from 3.0 to 6.0 μm, more preferably from 4.0 to 5.5 μm.

An under coating layer (or a subbing layer) may be provided between the support and the nonmagnetic or magnetic layer for adhesion improvement. The thickness of this under coating layer is from 0.01 to 0.5 μm, preferably from 0.02 to 0.5 μm. The nonmagnetic layer and the magnetic layer of the magnetic recording medium according to the present invention may be provided on both surface sides of the support or may be provided on either one surface side.

When the nonmagnetic layer and the magnetic layer are provided on only one surface side of the support, a back coating layer may be provided on the surface side of the support opposite to the side having the nonmagnetic layer and magnetic layer for the purpose of static charge prevention and curling correction. The thickness of this back coating layer is from 0.1 to 4 μm, preferably from 0.3 to 2.0 μm. Well-known under coating layers and back coating layers can be used for this purpose.

The thickness of the magnetic layer of the magnetic recording medium of the present invention can be optimally selected according to the saturation magnetization amount of the head used, the head gap length, and the recording signal zone, generally from 0.05 to 0.25 μm, preferably from 0.05 to 0.20 μm. The magnetic layer may comprise two or more layers each having different magnetic characteristics and well-known multilayer magnetic layer structures can be applied to the present invention.

The thickness of the lower nonmagnetic layer of the medium according to the present invention is generally from 0.2 to 5.0 μm, preferably from 0.3 to 3.0 μm, and more preferably from 1.0 to 2.5 μm. The lower layer of the recording medium of the present invention exhibits the effect of the present invention so long as it is substantially a nonmagnetic layer even if, or intendedly, it contains a small amount of a magnetic powder as an impurity, which is as a matter of course regarded as essentially the same construction as in the present invention. The term "substantially a nonmagnetic layer" means that the residual magnetic flux density of the lower layer is 100 G or less and the coercive force of the lower layer is 100 Oe or less, preferably the residual magnetic flux density and the coercive force are zero.

Back Coating Layer

In general, a magnetic tape for a computer data recording is decidedly required to have an excellent repeating-running property as compared with a video tape and an audio tape. For maintaining such a high running durability, it is preferred for the back coating layer to contain a carbon black and an inorganic powder.

Two kinds of carbon blacks respectively having different average particle sizes are preferably used in combination. In this case, a combined use of a fine carbon black having the average particle size of from 10 to 20 mμ and a coarse carbon black having the average particle size of frbm 230 to 300 mμ is preferred. In general, by the incorporation of a fine carbon black as above, the surface electrical resistance of the back coating layer and light transmittance can be set at a low values. There are many kinds of magnetic recording apparatuses making use of light transmittance of a tape and making it as signals of operation, therefore, the addition of fine carbon blacks are particularly effective in such a case. In addition, a fine carbon black is in general excellent in retention of a liquid lubricant and contributes to the reduction of a friction coefficient when a lubricant is used in combination. On the other hand, a coarse carbon black having a particle size of from 230 to 300 mμ has a function as a solid lubricant and forms minute protrusions on the surface of a back coating layer to reduce contact area and contributes to the reduction of a friction coefficient. However, a coarse carbon black has a drawback such that particles are liable to drop out from the back coating layer due to the tape sliding during severe running leading to the increase of the error rate.

Specific examples of fine carbon blacks commercially available include RAVEN 2000B (18 mμ) and RAVEN 1500B (17 mμ) (manufactured by Columbia Carbon Co., Ltd.), BP800 (17 mμ) (manufactured by Cabot Co., Ltd.), PRINTEX90 (14 mμ), PRINTEX95 (15 mμ), PRINTEX85 (16 mμ), PRINTEX75 (17 mμ) (manufactured by Degussa Co.), and #3950 (16 mμ) (manufactured by Mitsubishi Kasei Corp.).

Specific examples of coarse particle carbon blacks commercially available include THERMAL BLACK (270 mμ) (manufactured by Cancarb Co., Ltd.) and RAVEN MTP (275 mμ) (manufactured by Columbia Carbon Co., Ltd.).

When two kinds of carbon blacks respectively having different average particle sizes are used in combination in a back coating layer, the proportion of the contents (by weight) of a fine carbon black having a particle size of from 10 to 20 mμ and a coarse carbon black having a particle size of from 230 to 300 mμ is preferably the former/the latter of from 98/2 to 75/2, more preferably from 95/5 to 85/15.

The content of the carbon black in a back coating layer (the total amount when two kinds are used) is generally from 30 to 80 parts by weight, preferably from 45 to 65 parts by weight, based on 100 parts by weight of the binder.

It is preferred to use two kinds of inorganic powders respectively having different hardnesses.

Specifically, a soft inorganic powder having a Mohs' hardness of from 3 to 4.5 and a hard inorganic powder having a Mohs' hardness of from 5 to 9 are preferably used in combination.

By the addition of a soft inorganic powder having a Mohs' hardness of from 3 to 4.5, a friction coefficient can be stabilized against repeating-running. Moreover, a sliding guide pole is not scraped off in hardness within this range. The average particle size of such a soft inorganic powder is preferably from 30 to 50 mμ.

Examples of soft inorganic powders having a Mohs' hardness of from 3 to 4.5 include, e.g., calcium sulfate, calcium carbonate, calcium silicate, barium sulfate, magnesium carbonate, zinc carbonate and zinc oxide. They can be used alone or in combination of two or more. Of these, calcium carbonate is particularly preferred.

The content of the soft inorganic powder in a back coating layer is preferably from 10 to 140 parts by weight, more preferably from 35 to 100 parts by weight, based on 100 parts by weight of the carbon black.

By the addition of a hard inorganic powder having a Mohs' hardness of from 5 to 9, the strength of the back coating layer is increased and running durability is improved. When such the hard inorganic powders are used together with carbon blacks and the above-described soft inorganic powders, deterioration due to repeating sliding is reduced and strong back coating layer can be obtained. Appropriate abrasive capability is imparted to the back coating layer by the addition of the hard inorganic powder and the adhesion of scratched powders to a tape guide pole is reduced. In particular, when the hard inorganic powder is used in combination with a soft inorganic powder (in particular, calcium carbonate), sliding characteristics against a guide pole having a rough surface is improved and the stabilization of a friction coefficient of the back coating layer can also be brought about.

The average particle size of hard inorganic powders is preferably from 80 to 250 mμ, more preferably from 100 to 210 mμ.

Examples of hard inorganic powders having a Mohs' hardness of from 5 to 9 include, e.g., α-iron oxide, α-alumina, and chromium oxide ($Cr_2O_3$). These powders may be used alone or in combination. Of the above, α-iron oxide and α-alumina are preferred.

The content of the hard inorganic powder in a back coating layer is generally from 3 to 30 parts by weight, preferably from 3 to 20 parts by weight, based on 100 parts by weight of the carbon black.

When the above soft inorganic powder and hard inorganic powder are used in combination, it is preferred to use them selectively such that the difference of hardness between soft and hard inorganic powders is 2 or more, more preferably 2.5 or more, and particularly preferably 3 or more.

It is preferred that the above-described two kinds of inorganic powders respectively having different hardnesses and specific average particle sizes and the above-described two kinds of carbon blacks respectively having different specific average particle sizes are contained in the back coating layer. In particular, in this combination, calcium carbonate is preferably contained as a soft inorganic powder.

Lubricants may be contained in the back coating layer. Lubricants can be arbitrarily selected from among those which can be used in a magnetic layer or a nonmagnetic layer as described above. The content of lubricants added to the back coating layer is generally from 1 to 5 parts by weight based on 100 parts by weight of the binder.

Support

A support for use in the present invention is not particularly limited but is preferably substantially nonmagnetic and flexible support.

As a flexible support for use in the present invention, well-known films such as polyesters (e.g., polyethylene terephthalate or polyethylene naphthalate), polyolefins, cellulose triacetate, polycarbonate, polyamide, polyimide, polyamideimide, polysulfone, polyaramide, aromatic polyamide, or polybenzoxazole can be used. Highly strong supports such as polyethylene naphthalate or polyamide are preferably used. If necessary, a lamination type support as disclosed in JP-A-3-224127 can be used to vary the surface roughnesses of the magnetic layer surface and the base surface. The support may be previously subjected to surface treatments, such as a corona discharge treatment, a plasma treatment, an adhesion assisting treatment, a heat treatment, and a dust removing treatment. Aluminum or glass substrate can be used as a support in the present invention.

For attaining the object of the present invention, it is preferred to use the support having a central plane average surface roughness of 8.0 nm or less, preferably 4.0 nm or less, more preferably 2.0 nm or less, measured by "TOPO-3D" (a product of WYKO Co., Ltd., U.S.A.) by MIRAU method. It is preferred that the support not only has a small central plane average surface roughness but also is free from coarse protrusions (having a height) of 0.5 $\mu$m or more. Surface roughness configuration is freely controlled by the size and the amount of fillers added to the support. Examples of such the fillers include acryl-based organic fine powders, as well as oxides or carbonates of Ca, Si and Ti. The support for use in the present invention preferably has the maximum height (SRmax) of 1 $\mu$m or less, ten point average roughness (SRz) of 0.5 $\mu$m or less, central plane peak height (SRp) of 0.5 $\mu$m or less, central plane valley depth (SRv) of 0.5 $\mu$m or less, central plane area factor (SSr) of from 10% to 90%, and average wavelength (S$\lambda$a) of from 5 $\mu$m to 300 $\mu$m. For obtaining desired electromagnetic characteristics and durability, surface protrusion distribution of the support can be controlled arbitrarily by fillers, e.g., the number of protrusions having sizes of from 0.01 $\mu$m to 1 $\mu$m can be controlled each within the range of from 0 to 2,000 per 0.1 mm$^2$.

The F-5 value of the support for use in the present invention is preferably from 5 to 50 kg/mm$^2$, a thermal shrinkage factor of the support at 100° C. for 30 minutes is preferably 3% or less, more preferably 1.5% or less, and a thermal shrinkage factor at 80° C. for 30 minutes is preferably 1% or less, more preferably 0.5% or less. The support has a breaking strength of from 5 to 100 kg/mm$^2$, an elastic modulus of from 100 to 2,000 kg/mm$^2$, a temperature expansion coefficient of from $10^{-4}$ to $10^{-8}$/° C., preferably from $10^{-5}$ to $10^{-6}$/° C., and a humidity expansion coefficient of $10^{-4}$/RH% or less, preferably $10^{-5}$/RH% or less. These thermal characteristics, dimensional characteristics and mechanical strength characteristics are preferably almost equal in every direction of in-plane of the support with difference of 10% or less.

Producing Method

Processes of preparing the magnetic and nonmagnetic coating solutions for use in the magnetic recording medium of the present invention respectively comprise at least a kneading step, a dispersing step and, optionally, blending steps to be carried out before and/or after the kneading and dispersing steps. Any of these respective steps may be composed of two or more separate stages. Materials such as a magnetic powder, a nonmagnetic powder, a binder, a carbon black, an abrasive, an antistatic agent, a lubricant, a solvent, and the like for use in the present invention may be added at any step at any time. Each material may be added at two or more steps dividedly. For example, polyurethane can be added dividedly at a kneading step, a dispersing step, or a blending step for adjusting viscosity after dispersion. For achieving the object of the present invention, the above steps can be performed partly with conventional techniques. Powerful kneading machines such as an open kneader, a continuous kneader, a pressure kneader or an extruder are preferably used in a blending step. When a kneader is used, all or a part of a binder (preferably 30% or more of the total binders) are kneading-treated in the range of from 15 parts to 500 parts per 100 parts of the magnetic powder or nonmagnetic powder together with the magnetic powder or nonmagnetic powder. Details of these kneading are disclosed in JP-A-1-106338 and JP-A-1-79274. When dispersing a magnetic layer solution and a nonmagnetic layer solution, glass beads can be used but dispersing media having a high specific gravity is preferably used and zirconia beads, titania beads and steel beads are suitable for this purpose. Optimal particle size and packing density of these dispersing media should be selected. Known dispersing apparatuses can be used in the present invention.

The following methods are preferably used for coating the magnetic recording medium having a multilayer construction of the present invention. As the first method, the lower layer is coated by any of gravure coating, roll coating, blade coating, and extrusion coating apparatuses, which are ordinarily used in the coating of a magnetic coating solution, and the upper layer is coated while the lower layer is still wet by means of the support pressing type extrusion coating apparatus disclosed in JP-B-1-46186, JP-A-60-238179 and JP-A-2-265672. As the second method, the upper layer and the lower layer are coated almost simultaneously using the coating head equipped with two slits for feeding coating solution as disclosed in JP-A-63-88080, JP-A-2-17971 and JP-A-2-265672. And as the third method, the upper layer and the lower layer are coated almost simultaneously using the extrusion coating apparatus equipped with a backup roll as disclosed in JP-A-2-174965. For preventing the deterioration of the electromagnetic characteristics of the magnetic recording medium due to agglomeration of magnetic powders, it is preferred to impart shear to the coating solution in the coating head by methods as described in JP-A-62-95174 and JP-A-1-236968. With respect to the viscosity of the coating solution, the range of the numeric values disclosed in JP-A-3-8471 is necessary to be satisfied. For realizing the constitution of the present invention, successive multilayer coating method in which the magnetic layer is coated on the lower layer after the lower layer is coated and dried can of course be used without impairing the effect of the present invention. However, for reducing coating defects and improving quality, e.g., dropout, it is preferred to use the above simultaneous multilayer coating method.

In the case of a magnetic disc, isotropic orienting property can be sufficiently obtained in some cases without conducting orientation using orientating apparatus, but it is preferred to use well-known random orientation apparatuses, such as disposing cobalt magnets diagonally and alternately or applying an alternating current magnetic field using a solenoid. Isotropic orientation in a ferromagnetic metal fine powder is in general preferably in-plane two dimensional random orientation, but it may be three dimensional random orientation having vertical components. Hexagonal ferrites in general have an inclination for three dimensional random orientation of in-plane and in the vertical direction but it can be made in-plane two dimensional random orientation. Further, it is possible to impart to hexagonal ferrites isotropic magnetic characteristics in the circumferential direction by vertical orientation using well-known methods, e.g., using different pole and counter position magnets. In particular, vertical orientation is preferred when a disc is used in high density recording. Circumferential orientation can be conducted using spin coating.

In the case of a magnetic tape, orientation is conducted in the machine direction using a cobalt magnet and a solenoid. In orientation, it is preferred that the drying position of the coated film can be controlled by controlling the temperature and the amount of drying air and coating rate. Coating rate is preferably from 20 to 1,000 m/min. and the temperature of drying air is preferably 60° C. or more. Preliminary drying can be performed appropriately before entering the magnet zone.

Use of heat resisting plastic rolls such as epoxy, polyimide, polyamide and polyimideamide, or metal rolls is effective for calendering treatment. Metal rolls are usable for the treatment particularly when magnetic layers are coated on both surface sides. Treatment temperature is preferably 50° C. or more, more preferably 100° C. or more. Line pressure is preferably 200 kg/cm or more, more preferably 300 kg/cm or more.

Physical Properties

Saturation magnetic flux density of the magnetic layer of the magnetic recording medium according to the present invention is from 2,000 to 5,000 G when a ferromagnetic metal powder is used, and from 1,000 to 3,000 G when a hexagonal ferrite is used. Coercive force (Hc) and (Hr) are from 1,500 to 5,000 Oe, preferably from 1,700 to 3,000 Oe. Coercive force distribution is preferably narrow, and SFD and SFDr are preferably 0.6 or less. Squareness ratio is from 0.55 to 0.67, preferably from 0.58 to 0.64 in the case of two dimensional random orientation, from 0.45 to 0.55 in the case of three dimensional random orientation, and in the case of vertical orientation, from 0.6 to 0.7 in the vertical direction, and when diamagnetical correction is conducted, preferably from 0.7 to 0.8. Orientation ratio of two dimensional random orientation and three dimensional random orientation is preferably 0.8 or more. In the case of two dimensional random orientation, squareness ratio, Br, Hc and Hr in the vertical direction are preferably from 0.1 to 0.5 times of those in the in-plane direction.

In the case of a magnetic tape, squareness ratio is 0.7 or more, preferably 0.8 or more.

The friction coefficient of the magnetic recording medium against a head at temperature of −10° C. to 40° C., humidity of 0% to 95% is 0.5 or less, preferably 0.3 or less, the surface inherent resistivity of the magnetic surface is preferably from $10^4$ to $10^{12}$ Ω/sq, the charge potential is preferably from −500 V to +500 V, the elastic modulus at 0.5% elongation of the magnetic layer is preferably from 100 to 2,000 kg/mm$^2$ in every direction of in-plane, the breaking strength is preferably from 10 to 70 kg/cm$^2$, the elastic modulus of the magnetic recording medium is preferably from 100 to 1,500 kg/mm$^2$ in every direction of in-plane, the residual elongation is preferably 0.5% or less, and the thermal shrinkage factor at every temperature of 100° C. or less is preferably 1% or less, more preferably 0.5% or less, and most preferably 0.1% or less. The glass transition temperature of the magnetic layer (the maximum of elastic modulus loss by dynamic visco-elasticity measurement at 110 Hz) is preferably from 50° C. to 120° C., and that of the lower nonmagnetic layer is preferably from 0° C. to 100° C. The elastic modulus loss is preferably within the range of from $1\times10^8$ to $8\times10^9$ dyne/cm$^2$, and loss tangent is preferably 0.2 or less. If loss tangent is too large, adhesion failure is liable to occur. These thermal and mechanical characteristics are preferably almost equal in every direction of in-plane of the medium within difference of 10% or less. The residual amount of solvent in the magnetic layer is preferably 100 mg/m$^2$ or less, more preferably 10 mg/m$^2$ or less. The void ratio is preferably 30% by volume or less, more preferably 20% by volume or less, with both of the nonmagnetic layer and the magnetic layer. The void ratio is preferably smaller for obtaining high output but in some cases a specific value should be preferably secured depending on purposes. For example, in a disc-like medium which are repeatedly used, large void ratio contributes to good running durability in many cases.

The magnetic layer preferably has a central plane average surface roughness (Ra) of 4.0 nm or less, preferably 3.8 nm or less, more preferably 3.5 nm or less, by the measurement of area of about 250 $\mu$m×250 $\mu$m using "TOPO-3D" (a product of WYKO Co., Ltd., U.S.A.) by MIRAU method. The magnetic layer for use in the present invention preferably has the maximum height (SRmax) of 0.5 $\mu$m or less, ten point average roughness (SRz) of 0.3 $\mu$m or less, central plane peak height (SRp) of 0.3 $\mu$m or less, central plane valley depth (SRv) of 0.3 $\mu$m or less, central plane area factor (SSr) of from 20% to 80%, and average wavelength (S$\lambda$a) of from 5 $\mu$m to 300 $\mu$m. It is preferred to optimize electromagnetic characteristics and friction coefficient by setting surface protrusions of the magnetic layer within the above described range. They are easily controlled by controlling the surface property by fillers in the support, controlling the particle size and the amount of the magnetic powders added to the magnetic layer, or varying the surface shape of rolls used in the calendering treatment. Curling is preferably within the range of ±3 mm.

When the magnetic recording medium according to the present invention comprises a nonmagnetic layer and a magnetic layer, these physical properties in the nonmagnetic layer and the magnetic layer can be varied according to purposes. For example, the elastic modulus of the magnetic layer is made higher to improve running durability and at the same time the elastic modulus of the nonmagnetic layer is made lower than that of the magnetic layer to improve the head touching of the magnetic recording medium.

EXAMPLE

Examples of the present invention will be described in detail below but the present invention is not limited thereto.

Ferromagnetic Powder

Ferromagnetic powders used in examples are shown in Table 1 below.

TABLE 1

| Ferro-magnetic Powder | Kind*[1] | Particle Volume ($10^{-7}$ ml) | Hc (Oe) | σs (emu/g) | Analytical Value of*[2] Composition |
|---|---|---|---|---|---|
| A | BaF | 0.7 | 2,460 | 54 | Zn 0.8, Co 0.1, Nb 0.4 |
| B | BaF | 0.2 | 2,480 | 51 | Zn 0.6, Co 0.1, Nb 0.3 |
| C | BaF | 0.5 | 2,450 | 53 | Zn 0.7, Co 0.1, Nb 0.3 |
| D | BaF | 1.6 | 2,510 | 57 | Zn 0.9, Co 0.1, Nb 0.5 |
| E | BaF | 3.5 | 2,750 | 62 | Zn 1.1, Co 0.2, Nb 0.6 |
| F | BaF | 0.7 | 3,060 | 56 | Zn 1.0, Ni 0.5, Ti 0.4 |
| G | BaF | 0.7 | 3,520 | 58 | Zn 0.4, Co 0.1, Nb 0.3 |
| H | BaF | 0.7 | 1,750 | 54 | Zn 1.2, Co 0.3, Nb 0.4 |
| I | MP | 0.8 | 2,350 | 145 | Co 28, Al 7, Y 4 |
| J | MP | 8 | 2,310 | 137 | Co 21, Al 7, Y 5 |
| K | MP | 0.8 | 1,860 | 142 | Co 25, Al 10, Y 2 |

*[1]: BaF: A barium ferrite powder, MP: A ferromagnetic metal powder
*[2]: The composition of BaF is shown by mol number per mol of Ba. MP is by atomic % based on Fe.

Magnetic discs and magnetic tapes were prepared as described below using the ferromagnetic powders shown in Table 1.

Preparation of Coating Solution

| Magnetic Coating Solution 1 (hexagonal ferrite, disc) | |
|---|---|
| Barium ferrite magnetic powder | 100 parts |
| Vinyl chloride copolymer MR555 (manufactured by Nippon Zeon Co., Ltd.) | 5 parts |
| Polyurethane resin UR 8200 (manufactured by Toyobo Co., Ltd.) | 3 parts |
| α-Alumina (particle size: 0.2 μm) HIT55 (manufactured by Sumitomo Chemical Co., Ltd.) | 10 parts |
| Carbon black #55 (manufactured by Asahi Carbon Co., Ltd.) | 1 part |
| Average primary particle size: 0.075 μm | |
| Specific surface area ($S_{BET}$): 35 $m^2/g$ | |
| DBP oil absorption: 81 m/100 g | |
| pH: 7.7 | |
| Volatile content: 1.0% | |
| Phenylphosphonic acid | 2 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |

| Magnetic Coating Solution 2 (hexagonal ferrite powder, tape) | |
|---|---|
| Barium ferrite magnetic powder | 100 parts |
| Vinyl chloride copolymer MR555 (manufactured by Nippon Zeon Co., Ltd.) | 6 parts |
| Polyurethane resin UR 8200 (manufactured by Toyobo Co., Ltd.) | 3 parts |
| α-Alumina (particle size: 0.3 μm) HIT55 (manufactured by Sumitomo Chemical Co., Ltd.) | 2 parts |
| Carbon black (particle size: 0.015 μm) #55 (manufactured by Asahi Carbon Co., Ltd.) | 5 parts |
| Butyl stearate | 1 part |
| Stearic acid | 2 parts |
| Methyl ethyl ketone | 125 parts |
| Cyclohexanone | 125 parts |

-continued

Preparation of Coating Solution

| Magnetic Coating Solution 3 (ferromagnetic metal powder, disc) | |
|---|---|
| Ferromagnetic metal fine powder | 100 parts |
| Vinyl chloride copolymer MR110 (manufactured by Nippon Zeon Co., Ltd.) | 12 parts |
| Polyurethane resin UR 8200 (manufactured by Toyobo Co., Ltd.) | 3 parts |
| α-Alumina HIT55 (manufactured by Sumitomo Chemical Co., Ltd.) | 10 parts |
| Carbon black #55 (manufactured by Asahi Carbon Co., Ltd.) | 5 parts |
| Phenylphosphonic acid | 3 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 180 parts |
| Cyclohexanone | 180 parts |

| Magnetic Coating Solution 4 (ferromagnetic metal powder, tape) | |
|---|---|
| Ferromagnetic metal fine powder | 100 parts |
| Vinyl chloride copolymer MR110 (manufactured by Nippon Zeon Co., Ltd.) | 12 parts |
| Polyurethane resin UR 8200 (manufactured by Toyobo Co., Ltd.) | 3 parts |
| α-Alumina HIT55 (manufactured by Sumitomo Chemical Co., Ltd.) | 2 parts |
| Carbon black #55 (manufactured by Asahi Carbon Co., Ltd.) | 1 part |
| Butyl stearate | 1 part |
| Stearic acid | 5 parts |
| Methyl ethyl ketone | 100 parts |
| Cyclohexanone | 20 parts |
| Toluene | 60 parts |

| Nonmagnetic Coating Solution 5 (for a nonmagnetic layer, disc) | |
|---|---|
| Nonmagnetic powder, $TiO_2$, crystal system rutile | 80 parts |
| Average primary particle size: 0.035 μm | |
| Specific surface area ($S_{BET}$): 40 $m^2/g$ | |
| pH: 7 | |
| $TiO_2$ content: 90% or more | |
| DBP oil absorption: 27 to 38 ml/100 g | |
| Surface-covering compound: $Al_2O_3$, 8 wt % | |
| Carbon black CONDUCTEX SC-U (manufactured by Columbia Carbon Co., Ltd.) | 20 parts |
| Average primary particle size: 0.020 μm | |
| Specific surface area ($S_{BET}$): 220 $m^2/g$ | |
| DBP oil absorption: 115 ml/100 g | |
| pH: 7.0 | |
| Volatile content: 1.5% | |
| Vinyl chloride copolymer MR110 (manufactured by Nippon Zeon Co., Ltd.) | 12 parts |
| Polyurethane resin UR 8200 (manufactured by Toyobo Co., Ltd.) | 5 parts |
| Phenylphosphonic acid | 4 parts |
| Butyl stearate | 10 parts |
| Butoxyethyl stearate | 5 parts |
| Isohexadecyl stearate | 2 parts |
| Stearic acid | 3 parts |
| Methyl ethyl ketone/cyclohexanone (8/2 mixed solution) | 250 parts |

| Nonmagnetic Coating Solution 6 (for a nonmagnetic layer, tape) | |
|---|---|
| Nonmagnetic powder, $TiO_2$, crystal system rutile | 80 parts |
| Average primary particle size: 0.035 μm | |
| Specific surface area ($S_{BET}$): 40 $m^2/g$ | |
| pH: 7 | |
| $TiO_2$ content: 90% or more | |
| DBP oil absorption: 27 to 38 ml/100 g | |
| Surface-covering compound: $Al_2O_3$, 8 wt % | |
| Carbon black CONDUCTEX SC-U (manufactured by Columbia Carbon Co., Ltd.) | 20 parts |
| Vinyl chloride copolymer MR110 (manufactured by Nippon Zeon Co., Ltd.) | 12 parts |

-continued

| | |
|---|---|
| Polyurethane resin UR 8200 (manufactured by Toyobo Co., Ltd.) | 5 parts |
| Phenylphosphonic acid | 4 parts |
| Butyl stearate | 1 part |
| Stearic acid | 3 parts |
| Methyl ethyl ketone/cyclohexanone (8/2 mixed solution) | 250 parts |

Preparation Method 1 (discs D1, D5 to D14, D18, D19)

Each of the above compositions of the coating solutions for the magnetic layer and the nonmagnetic layer were respectively blended in a kneader, then dispersed with a sand mill for 4 hours. Polyisocyanate was added to each resulting dispersion solution, in an amount of 10 parts to the nonmagnetic layer coating solution, and 10 parts to the magnetic layer coating solution. Further, 40 parts of cyclohexanone was added to each solution. Each solution was filtered through a filter having an average pore diameter of 1 μm to obtain coating solutions for forming the nonmagnetic layer and the magnetic layer.

These coating solutions were simultaneously multilayer-coated on a polyethylene terephthalate support having a thickness of 62 μm and a central plane average surface roughness of 3 nm of the side on which a magnetic layer was to be coated. The nonmagnetic layer coating solution was coated in a dry thickness of 1.5 μm, immediately thereafter, the magnetic layer coating solution was coated on the coated nonmagnetic layer while the nonmagnetic layer was still wet so as to give the magnetic layer having a thickness of 0.15 μm. Each of levels used ferromagnetic metal powders was subjected to random orientation while both layers were still wet by passing through an alternating current magnetic field generator having two magnetic field intensities of frequency of 50 Hz, magnetic field intensity of 250 Gauss and frequency of 50 Hz, magnetic field intensity of 120 Gauss. After drying, the coated layer was subjected to calendering treatment with calenders of 7 stages at 90° C. at line pressure of 300 kg/cm. The obtained web was punched to a disc of 3.5 inches and the disc was subjected to a surface treatment by abrasives, thus a disc medium was obtained.

Preparation Method 2 (discs D2 and D16)

Discs were prepared in the same manner as in Preparation Method 1 except that the time of dispersion using a sand mill was changed to 6 hours.

Preparation Method 3 (discs D3 and D17)

Discs were prepared in the same manner as in Preparation Method 2 except that α-alumina "HIT55" was changed to "HIT82" (particle size: 0.12 μm).

Preparation Method 4 (discs D4 and D15)

Discs were prepared in the same manner as in Preparation Method 1 except that carbon black "#55" was changed to "#35".

Carbon black #35:

- Average primary particle size: 0.115 μm
- Specific surface area $S_{BET}$: 23 $m^2/g$
- DBP oil absorption: 47 ml/100 g
- pH: 7.0
- Volatile content: 1.0%

Preparation Method 5 (computer tapes T1, T5 to T14, T18, T19)

Each of the above compositions of the coating solutions for the magnetic layer and the nonmagnetic layer were respectively blended in a kneader, then dispersed with a sand mill for 4 hours. Polyisocyanate was added to each resulting dispersion solution, in an amount of 2.5 parts to the nonmagnetic layer coating solution, and 3 parts to the magnetic layer coating solution. Further, 40 parts of cyclohexanone was added to each solution. Each solution was filtered through a filter having an average pore diameter of 1 μm to obtain coating solutions for forming the nonmagnetic layer and the magnetic layer.

These coating solutions were simultaneously multilayer-coated on an aramide support (trade name: Mictron) having a thickness of 4.4 μm and a central plane average surface roughness of 2 nm of the side on which a magnetic layer was to be coated. The nonmagnetic lower layer coating solution was coated in a dry thickness of 1.7 μm, immediately thereafter the upper magnetic layer coating solution was coated on the lower layer so as to give the magnetic layer having a thickness of 0.15 μm. Magnetic powders were oriented with a cobalt magnet having a magnetic force of 6,000 G and a solenoid having a magnetic force of 6,000 G while both layers were still wet. After drying, the coated layer was subjected to calendering treatment with calenders of 7 stages comprising metal rolls at 85° C. at a rate of 200 m/min. Subsequently, a backing layer (100 parts of a carbon black having an average particle size of 17 mμ, 80 parts of calcium carbonate having an average particle size of 40 mμ, and 5 parts of α-alumina having an average particle size of 200 mμ were dispersed in a nitrocellulose resin, a polyurethane resin and a polyisocyanate) having a thickness of 0.5 μm was coated. The obtained web was slit to a width of 3.8 mm. The magnetic layer surface of the thus-produced web was cleaned with a tape cleaning apparatus of a nonwoven fabric and a razor blade pressed against the surface of the tape, which was attached to a machine having delivery and winding-up motion of a slit product. Thus, a tape sample was obtained.

Preparation Method 6 (computer tapes T2 and T16)

Computer tapes were prepared in the same manner as in Preparation Method 5 except that the time of dispersion using a sand mill was changed to 6 hours.

Preparation Method 7 (computer tapes T3 and T17)

Computer tapes were prepared in the same manner as in Preparation Method 6 except that α-alumina "HIT55" was changed to "HIT82".

Preparation Method 8 (computer tapes T4 and T15)

Computer tapes were prepared in the same manner as in Preparation Method 5 except that carbon black "#55" was changed to "#35".

The above prepared magnetic discs D1 to D19 and computer tapes T1 to T19 were evaluated by the following methods.

Evaluation Methods (1) Magnetic characteristics (Hc, σs)

Magnetic characteristics were measured using a vibrating sample magnetometer (VSM) (a product of Toei Kogyo Co., Ltd.) by Hm 10 KOe.

(2) S/N ratio (disc)

Measurement was conducted using a recording head (MIG (Metal in Gap), gap: 0.15 μm, 1.8 T) and an MR head for reproduction attached to a spin stand. With rotation number: from 2,500 to 3,500 r.p.m., radius: 30 mm, noise: DC noise, measurement was carried out.

(3) C/N ratio (tape)

Measurement was conducted using a recording head (MIG, gap: 0.15 μm, 1.8 T) and an MR head for reproduction attached to a drum tester. With relative speed of the head and media: from 1 to 3 m/min., noise: modulation noise, measurement was carried out.

(4) Magnetization reversal volume

The magnetic field sweep rate of the measuring point of Hc was measured for 5 minutes and 30 minutes using the above-described VSM, and magnetization reversal volume was obtained from the following relational expression of Hc and magnetization reversal volume by thermal fluctuation.

$$Hc=(2K/Ms)\{1-[(kT/KV)ln(At/0.693)]^{1/2}\}$$

wherein

K: Anisotropic constant

Ms: Saturation magnetization k: Boltzmann's constant

T: Absolute temperature

V: Magnetization reversal volume

A: Spin precession frequency t: Magnetic field reversal time (5) Surface protrusion:

With respect to surface protrusions, numbers of minute protrusions $N_{30nm}$ and $N_{10nm}$ in 30 μm-square (900 μm$^2$) were measured using "Nanoscope 3" (AFM: an interatomic force microscope) (a product of Digital Instruments Corp.) with a test prod of SiN of rectangular pyramid having edge angles of 70°.

(6) Durability (a) Durability of a magnetic disc: A floppy disc drive ("ZIP100", a product of IOMEGA CORP., U.S.A., rotation number: 2,968 rpm) was used. The head was fixed at the position of radium of 38 mm. A disc was run under the following thermo-cycle condition, which being taken as one cycle. The point when the sample surface was scratched was taken as NG by visual evaluation. Enduring time of Sample No. D1 was taken as 100%.

Thermo-Cycle Flow

25° C., 50% RH, 1 hr→(temperature up, 2 hr)→60° C., 20% RH, 7 hr→(temperature down, 2 hr)→25° C., 50% RH, 1 hr →(temperature down, 2 hr)→5° C., 10% RH, 7 hr→(temperature up, 2 hr)→(this cycle was repeated).

(b) Durability of a computer tape: DDS drive was used. Predetermined signals were recorded on the tape and the tape was run at 50° C., 10% RH with monitoring reproduced signals. The point when the initial reproduction output reached 70% was taken as NG and shown with Sample No. T1 being taken as 100%.

The results of evaluations on magnetic discs are shown in Table 2 and those on magnetic tapes are shown in Table 3.

TABLE 2

Results of evaluation of Magnetic discs

| Medium No. | Remarks | Kind of Ferro-magnetic Powder | Linear Recording Density (kbpi) | Track Density (tpi) | Areal Recording Density (G bit/inch$^2$) | $N_{30nm}$ (number/900 μm$^2$) | $N_{10nm}$ (number/900 μm$^2$) | V ($10^{-7}$ ml) | Hc (Oe) | S/N Ratio (dB) | Enduring Time (%) |
|---|---|---|---|---|---|---|---|---|---|---|---|
| D1 | Ex. | A | 144 | 5,200 | 0.75 | 75 | 2,500 | 1.0 | 2,400 | 24.0 | 100 |
| D2 | Ex. | A | 144 | 5,200 | 0.75 | 40 | 1,500 | 1.1 | 2,430 | 25.0 | 110 |
| D3 | Ex. | A | 144 | 5,200 | 0.75 | 5 | 900 | 0.9 | 2,410 | 25.5 | 95 |
| D4 | Comp. | A | 144 | 5,200 | 0.75 | 115 | 2,600 | 0.8 | 2,380 | 18.0 | 120 |
| D4 | Comp. | A | 100 | 4,000 | 0.40 | 115 | 2,600 | 1.0 | 2,380 | 26.0 | 120 |
| D5 | Ex. | B | 144 | 5,200 | 0.75 | 60 | 2,400 | 0.4 | 2,450 | 25.0 | 110 |
| D6 | Ex. | C | 144 | 5,200 | 0.75 | 72 | 2,300 | 0.8 | 2,360 | 25.5 | 105 |
| D7 | Ex. | D | 144 | 5,200 | 0.75 | 75 | 2,900 | 2.0 | 2,650 | 24.0 | 95 |
| D8 | Ex. | E | 144 | 5,200 | 0.75 | 75 | 2,800 | 4.0 | 2,700 | 23.0 | 98 |
| D9 | Comp. | E | 144 | 5,200 | 0.75 | 73 | 2,400 | 6.0 | 2,720 | 19.0 | 97 |
| D10 | Ex. | A | 200 | 7,500 | 1.50 | 72 | 2,200 | 1.2 | 2,430 | 23.0 | 103 |
| D11 | Ex. | F | 200 | 7,500 | 1.50 | 76 | 2,800 | 1.1 | 3,000 | 23.7 | 95 |
| D12 | Ex. | G | 200 | 7,500 | 1.50 | 81 | 2,600 | 0.9 | 3,500 | 24.0 | 110 |
| D13 | Comp. | H | 144 | 5,200 | 0.75 | 76 | 2,100 | 1.4 | 1,700 | 20.0 | 120 |
| D14 | Ex. | I | 144 | 5,200 | 0.75 | 75 | 2,000 | 0.7 | 2,300 | 24.0 | 96 |
| D15 | Comp. | I | 144 | 5,200 | 0.75 | 110 | 2,900 | 0.9 | 2,310 | 18.0 | 92 |
| D15 | Comp. | I | 100 | 4,000 | 0.40 | 110 | 2,900 | 0.9 | 2,310 | 26.0 | 105 |
| D16 | Ex. | I | 144 | 5,200 | 0.75 | 40 | 1,600 | 1.0 | 2,340 | 25.0 | 102 |
| D17 | Ex. | I | 144 | 5,200 | 0.75 | 7 | 800 | 1.1 | 2,360 | 25.7 | 97 |
| D18 | Comp. | J | 144 | 5,200 | 0.75 | 40 | 1,900 | 5.6 | 2,280 | 19.0 | 130 |
| D19 | Comp. | K | 144 | 5,200 | 0.75 | 20 | 1,500 | 1.0 | 1,800 | 20.0 | 100 |

TABLE 3

Results of evaluation of magnetic tapes

| Medium No. | Remarks | Kind of Ferro-magnetic Powder | Linear Recording Density (kbpi) | Track Density (tpi) | Areal Recording Density (G bit/inch$^2$) | $N_{30nm}$ (number/900 μm$^2$) | $N_{10nm}$ (number/900 μm$^2$) | V ($10^{-7}$ ml) | Hc (Oe) | S/N Ratio (dB) | Enduring Time (%) |
|---|---|---|---|---|---|---|---|---|---|---|---|
| T1 | Ex. | A | 140 | 5,000 | 0.70 | 75 | 2,500 | 1.0 | 2,520 | 0.0 | 100 |
| T2 | Ex. | A | 140 | 5,000 | 0.70 | 40 | 1,500 | 1.2 | 2,530 | 1.3 | 110 |
| T3 | Ex. | A | 140 | 5,000 | 0.70 | 5 | 900 | 0.9 | 2,480 | 1.2 | 120 |
| T4 | Comp. | A | 140 | 5,000 | 0.70 | 115 | 2,600 | 0.8 | 2,500 | −6.1 | 96 |
| T4 | Comp. | A | 100 | 4,000 | 0.40 | 115 | 2,600 | 0.8 | 2,500 | 2.0 | 92 |
| T5 | Ex. | B | 140 | 5,000 | 0.70 | 75 | 2,400 | 0.5 | 2,490 | 1.5 | 105 |
| T6 | Ex. | C | 140 | 5,000 | 0.70 | 76 | 2,300 | 0.8 | 2,530 | 1.6 | 102 |
| T7 | Ex. | D | 140 | 5,000 | 0.70 | 70 | 2,900 | 2.0 | 2,710 | 0.0 | 97 |

TABLE 3-continued

Results of evaluation of magnetic tapes

| Medium No. | Remarks | Kind of Ferro-magnetic Powder | Linear Recording Density (kbpi) | Track Density (tpi) | Areal Recording Density (G bit/inch$^2$) | $N_{30nm}$ (number/900 $\mu m^2$) | $N_{10nm}$ (number/900 $\mu m^2$) | V ($10^{-7}$ ml) | Hc (Oe) | S/N Ratio (dB) | Enduring Time (%) |
|---|---|---|---|---|---|---|---|---|---|---|---|
| T8 | Ex. | E | 140 | 5,000 | 0.70 | 68 | 2,800 | 4.0 | 2,780 | −1.2 | 130 |
| T9 | Comp. | E | 140 | 5,000 | 0.70 | 76 | 2,400 | 6.0 | 2,790 | −5.2 | 97 |
| T10 | Ex. | A | 200 | 7,500 | 1.50 | 75 | 2,200 | 1.1 | 2,560 | −1.2 | 103 |
| T11 | Ex. | F | 200 | 7,500 | 1.50 | 72 | 2,800 | 1.3 | 3,120 | −0.4 | 95 |
| T12 | Ex. | G | 200 | 7,500 | 1.50 | 73 | 2,600 | 0.9 | 3,650 | −0.2 | 110 |
| T13 | Comp. | H | 140 | 5,000 | 0.70 | 70 | 2,100 | 0.8 | 1,860 | −4.0 | 120 |
| T14 | Ex. | I | 140 | 5,000 | 0.70 | 75 | 2,000 | 1.2 | 2,390 | 0.1 | 96 |
| T15 | Comp. | I | 140 | 5,000 | 0.70 | 112 | 2,900 | 1.0 | 2,400 | −6.5 | 96 |
| T15 | Comp. | I | 100 | 4,000 | 0.40 | 112 | 2,900 | 1.0 | 2,400 | 2.3 | 120 |
| T16 | Ex. | I | 140 | 5,000 | 0.70 | 43 | 1,600 | 0.9 | 2,460 | 1.2 | 95 |
| T17 | Ex. | I | 140 | 5,000 | 0.70 | 8 | 800 | 1.3 | 2,450 | 2.0 | 97 |
| T18 | Comp. | J | 140 | 5,000 | 0.70 | 42 | 1,900 | 5.6 | 2,340 | −5.6 | 160 |
| T19 | Comp. | K | 140 | 5,000 | 0.70 | 22 | 1,500 | 1.0 | 1,960 | −3.9 | 95 |

As is apparent from the results in Tables 2 and 3, Comparative Sample Nos. D4, D15, T4 and T15 are examples whose $N_{30nm}$ are more than 100/900 $\mu m^2$, and from respective two examples thereof with varying surface recording density, when surface recording density is 0.15 G bit/inch$^2$ or more, noise is increased and S/N ratio or C/N ratio is reduced, but when surface recording density is lower than the range of the present invention, electromagnetic characteristics are not particularly influenced.

Further, in Comparative Sample Nos. D9, D18, T9 and T18, as V is more than $5\times10^{-17}$ ml, noise increases and S/N ratio or C/N ratio is reduced. Further, in Comparative Sample Nos. D13, D19, T13 and T19, as Hc is less than 2,000 Oe, S/N ratio or C/N ratio is reduced. On the other hand, both of magnetic disc and computer tape samples according to the present invention which satisfy $N_{30nm}$, V and Hc show surface recording density of 0.15 G bit/inch$^2$ or more, high S/N ratio or C/N ratio and excellent durability.

EFFECT OF THE INVENTION

The present invention can provide a high capacity magnetic recording medium for use in a system of reproducing signals recorded at the areal recording density of from 0.15 to 2 G bit/inch$^2$ with an MR head, which can be realized by regulating $N_{30nm}$, V and Hc of the magnetic layer of the magnetic recording medium respectively within appropriate ranges. Further, the present invention can improve noise in electromagnetic characteristics while maintaining high durability.

While the invention has been described in detail and with reference to specific examples thereof, it will be apparent to one skilled in the art that various changes and modifications can be made therein without departing from the spirit and scope thereof.

What is claimed is:

1. A magnetic recording medium which comprises a support having thereon a magnetic layer mainly comprising a ferromagnetic powder dispersed in a binder, for a magnetic recording/reproduction system of reproducing recorded signals of from 0.15 to 2 G bit/inch$^2$ of areal recording density with a magneto resistive head, wherein the surface of said magnetic recording layer has not more than 100 protrusions having a height of 30 nm or more per 900 $\mu m^2$ measured using an atomic force microscope (AFM), the magnetization reversal volume of said magnetic layer is from $0.1\times10^{-17}$ to $5\times10^{-17}$ ml, and the coercive force of said magnetic layer is 2,000 Oe or more.

2. The magnetic recording medium as claimed in claim 1, wherein the surface of said magnetic recording layer has from 500 to 10,000 protrusions having a height of 10 nm or more per 900 $\mu m^2$ measured using an atomic force microscope (AFM).

3. The magnetic recording medium as claimed in claim 1, wherein said ferromagnetic powder is a ferromagnetic metal powder or a hexagonal ferrite powder.

4. The magnetic recording medium as claimed in claim 1, wherein the thickness of said magnetic layer is from 0.3 $\mu$m or less.

5. The magnetic recording medium as claimed in claim 1, wherein a substantially nonmagnetic lower layer is provided between said magnetic layer and the support.

6. The magnetic recording medium as claimed in claim 1, wherein the surface of said magnetic recording layer has not more than 50 protrusions having a height of 30 nm or more per 900 $\mu m^2$ and from 1,000 to 5,000 protrusions having a height of 10 nm or more per 900 $\mu m^2$, measured using an atomic force microscope (AFM).

7. The magnetic recording medium as claimed in claim 1, wherein said ferromagnetic powder is a ferromagnetic metal powder and the magnetization reversal volume of said magnetic layer is from $0.1\times10^{-17}$ to $4\times10^{-17}$ ml.

8. The magnetic recording medium as claimed in claim 1, wherein said ferromagnetic powder is a hexagonal ferrite powder and the magnetization reversal volume of said magnetic layer is from $0.1\times10^{-17}$ to $2\times10^{-17}$ ml.

9. The magnetic recording medium as claimed in claim 1, wherein said magnetic layer further contains an abrasive in an amount of from 5 to 30 parts by weight based on 100 parts by weight of the ferromagnetic powder.

10. The magnetic recording medium as claimed in claim 1, wherein the thickness of said magnetic layer is from 0.01 to 0.25 $\mu$m.

11. The magnetic recording medium as claimed in claim 1, wherein said support has a surface shape having a central plane average surface roughness (Ra) of 10 nm or less, measured by the 3D-MIRAU method.

12. The magnetic recording medium as claimed in claim 1, wherein said magnetic recording medium is a disk-like magnetic recording medium.

13. The magnetic recording medium as claimed in claim 1, wherein said areal recording density is from 0.5 to 2 G bit/inch$^2$.

14. The magnetic recording medium as claimed in claim 1, wherein said support is a flexible support.

* * * * *